US012186759B2

(12) United States Patent
Paul

(10) Patent No.: US 12,186,759 B2
(45) Date of Patent: Jan. 7, 2025

(54) HAMMER

(71) Applicant: Genesis III, Inc., Prophetstown, IL (US)

(72) Inventor: Seth Paul, Bettendorf, IA (US)

(73) Assignee: Genesis III, Inc., Prophetstown, IL (US)

( * ) Notice: Subject to any disclaimer, the term of this patent is extended or adjusted under 35 U.S.C. 154(b) by 0 days.

(21) Appl. No.: 18/537,118

(22) Filed: Dec. 12, 2023

(65) Prior Publication Data

US 2024/0109072 A1 Apr. 4, 2024

Related U.S. Application Data

(63) Continuation of application No. 17/499,249, filed on Oct. 12, 2021, now Pat. No. 11,839,879.

(60) Provisional application No. 63/090,099, filed on Oct. 9, 2020.

(51) Int. Cl.
*B02C 13/28* (2006.01)
*B02C 13/04* (2006.01)

(52) U.S. Cl.
CPC .............. *B02C 13/28* (2013.01); *B02C 13/04* (2013.01)

(58) Field of Classification Search
CPC ......... B02C 13/04; B02C 13/16; B02C 13/28; B02C 2013/2812
See application file for complete search history.

(56) References Cited

U.S. PATENT DOCUMENTS 758,288 A 4/1904 Williams
858,772 A 7/1907 Williams
906,364 A 12/1908 Williams
1,016,979 A 2/1912 Williams
1,041,495 A 10/1912 Liggett et al.
1,085,692 A 2/1914 Liggett
1,266,894 A 5/1918 Williams
RE14,865 E 6/1918 Plaisted
(Continued)

FOREIGN PATENT DOCUMENTS

AU 520935 B2 3/1982
AU 520936 B2 3/1982
(Continued)

OTHER PUBLICATIONS

Genesis3-P0696-I-BR Search Report & Written Opinion, Nov. 3, 2020.

(Continued)

*Primary Examiner* — Bobby Yeonjin Kim
(74) *Attorney, Agent, or Firm* — Hamilton IP Law, PC.; Jay R. Hamilton

(57) ABSTRACT

The various embodiments disclosed and pictured illustrate a hammer cluster for comminuting various materials. The embodiments pictured and described herein are primarily for use with a rotatable hammermill assembly. An illustrative embodiment of a hammer cluster may include at least two hammers each having a connection portion, a contact portion, and a neck connecting the contact and connection portions. The connection portions may include a connection aperture with a relief cavity having a tab on either side thereof. A collar having a collar gap defined by two collar edges may be inserted through connection apertures of each hammer. The collar edges may engage the respective tabs such that the hammers and the collar may rotate about a rod positioned within the collar as a singular unit.

22 Claims, 28 Drawing Sheets

(56) References Cited

U.S. PATENT DOCUMENTS

| | | | |
|---|---|---|---|
| RE14,920 | E | 4/1919 | Plaisted |
| 1,433,042 | A | 10/1922 | Sedberry |
| 1,444,990 | A | 2/1923 | Wauthier |
| 1,630,021 | A | 5/1927 | Lucas |
| 1,678,723 | A | 7/1928 | Clement |
| 1,693,058 | A | 11/1928 | Shelton |
| 1,759,905 | A | 5/1930 | Keith |
| 1,760,097 | A | 5/1930 | Williams |
| 1,761,038 | A | 6/1930 | Liggett |
| 1,787,526 | A | 1/1931 | Honstain |
| 1,827,986 | A | 10/1931 | Inglehart |
| 1,829,325 | A | 10/1931 | Alfred |
| 1,854,844 | A | 4/1932 | Kaemmerling |
| 1,889,129 | A | 11/1932 | Christian |
| 1,911,718 | A | 5/1933 | Saunders |
| 1,954,175 | A | 4/1934 | Jensen |
| 1,997,553 | A | 4/1935 | Taylor et al. |
| 2,015,581 | A | 9/1935 | Armour |
| 2,207,455 | A | 7/1940 | Clement |
| 2,237,510 | A | 4/1941 | Tankersley |
| 2,244,577 | A | 6/1941 | Schreiber |
| 2,404,778 | A | 7/1946 | Allison |
| 2,531,597 | A | 11/1950 | Anderson |
| 2,566,758 | A | 9/1951 | Anderson |
| 2,566,798 | A | 9/1951 | Hiller |
| 2,602,597 | A | 7/1952 | Ball |
| 2,607,538 | A | 8/1952 | Larson |
| 2,716,526 | A | 8/1955 | Baker |
| 2,763,439 | A | 9/1956 | Mankoff |
| 3,022,018 | A | 2/1962 | Knight |
| 3,045,934 | A | 7/1962 | Eilers |
| 3,058,676 | A | 10/1962 | Hermann |
| 3,222,854 | A | 12/1965 | Barth |
| 3,278,126 | A | 10/1966 | Ratkowski |
| 3,379,383 | A | 4/1968 | Stepanek |
| 3,482,789 | A | 12/1969 | Newell |
| 3,598,008 | A | 8/1971 | Jacobson et al. |
| 3,627,212 | A | 12/1971 | Stanton |
| 3,738,586 | A | 6/1973 | Fabert |
| 4,129,262 | A | 12/1978 | Lowry |
| 4,141,512 | A | 2/1979 | Francis |
| 4,142,687 | A | 3/1979 | Potwin |
| 4,162,767 | A | 7/1979 | Hahn |
| 4,177,956 | A | 12/1979 | Fawcett |
| 4,288,904 | A | 9/1981 | Lindberg |
| 4,310,125 | A | 1/1982 | Novotny |
| 4,341,353 | A | 7/1982 | Hamilton et al. |
| 4,343,438 | A | 8/1982 | Slikas et al. |
| 4,352,774 | A | 10/1982 | Hornberger |
| 4,406,415 | A | 9/1983 | Greer |
| 4,558,826 | A | 12/1985 | Martinek |
| 4,729,516 | A | 3/1988 | Williams, Jr. |
| 4,795,103 | A | 1/1989 | Lech |
| 4,856,170 | A | 8/1989 | Kachik |
| 4,907,750 | A | 3/1990 | Seifert |
| 4,915,310 | A | 4/1990 | Stelk |
| 5,002,233 | A | 3/1991 | Williams |
| 5,072,888 | A | 12/1991 | Stelk |
| 5,188,303 | A | 2/1993 | Hoof |
| 5,364,038 | A | 11/1994 | Prew |
| 5,377,919 | A | 1/1995 | Rogers et al. |
| 5,381,975 | A | 1/1995 | Chon |
| 5,443,216 | A | 8/1995 | Lajoie |
| 5,465,912 | A | 11/1995 | Graybill |
| 5,497,950 | A | 3/1996 | Schrodl |
| 5,605,291 | A | 2/1997 | Doskocil |
| 5,611,496 | A | 3/1997 | Fleenor |
| 5,628,467 | A | 5/1997 | Graveman |
| 5,692,688 | A | 12/1997 | Waitman et al. |
| 5,722,607 | A | 3/1998 | Hellmich |
| 5,842,653 | A | 12/1998 | Elliott et al. |
| 5,904,306 | A | 5/1999 | Elliott et al. |
| 6,045,072 | A | 4/2000 | Zehr |
| 6,131,838 | A | 10/2000 | Balvanz |
| 6,142,400 | A | 11/2000 | Balvanz et al. |
| 6,260,778 | B1 | 7/2001 | Wenger |
| 6,299,082 | B1 | 10/2001 | Smith |
| 6,364,227 | B1 | 4/2002 | Dorscht |
| 6,419,173 | B2 | 7/2002 | Balvanz et al. |
| 6,481,654 | B1 | 11/2002 | Balvanz |
| 6,517,020 | B1 | 2/2003 | Smith |
| 6,622,951 | B1 | 9/2003 | Recker |
| 6,971,598 | B2 | 12/2005 | Schillinger et al. |
| 7,140,569 | B2 | 11/2006 | Young |
| D536,350 | S | 2/2007 | Young |
| D536,351 | S | 2/2007 | Young |
| D536,352 | S | 2/2007 | Young |
| D544,503 | S | 6/2007 | Young |
| D544,504 | S | 6/2007 | Young |
| D545,327 | S | 6/2007 | Young |
| D545,328 | S | 6/2007 | Young |
| D545,846 | S | 7/2007 | Young |
| D545,847 | S | 7/2007 | Young |
| D550,728 | S | 9/2007 | Young |
| D551,266 | S | 9/2007 | Young |
| D551,267 | S | 9/2007 | Young |
| D552,639 | S | 10/2007 | Young |
| D555,679 | S | 11/2007 | Young |
| 7,325,761 | B2 | 2/2008 | Chen et al. |
| D573,163 | S | 7/2008 | Young |
| 7,419,109 | B1 | 9/2008 | Ronfeldt et al. |
| D588,174 | S | 3/2009 | Young |
| 7,559,497 | B2 | 7/2009 | Young |
| 7,621,477 | B2 | 11/2009 | Young |
| 7,819,352 | B2 | 10/2010 | Young |
| 10,610,870 | B2 | 4/2020 | Young |
| 2002/0190148 | A1 | 12/2002 | Roozeboom et al. |
| 2003/0037832 | A1 | 2/2003 | Cheung |
| 2004/0017955 | A1 | 1/2004 | Schillinger et al. |
| 2006/0032958 | A1 | 2/2006 | Young |
| 2007/0023554 | A1 | 2/2007 | Young |
| 2009/0321546 | A1 | 12/2009 | Plumb et al. |
| 2010/0025511 | A1 | 2/2010 | Young |
| 2010/0213301 | A1 | 8/2010 | Hoice et al. |
| 2011/0042498 | A1 | 2/2011 | Young et al. |
| 2017/0291175 | A1 | 10/2017 | Plumb |
| 2017/0368552 | A1 | 12/2017 | Plumb |
| 2020/0122152 | A1 | 4/2020 | Roska et al. |

FOREIGN PATENT DOCUMENTS

| | | | |
|---|---|---|---|
| CA | 2613956 | A1 | 2/2009 |
| CN | 2086168 | U | 10/1991 |
| CN | 2257741 | | 7/1997 |
| DE | 10215833 | | 4/2006 |
| WO | 03018202 | A1 | 3/2003 |

OTHER PUBLICATIONS

Jacobs Corporation. Advertisement. "The Pentagon Hammer System" Nov. 19, 2008.

Jacobs Corporation. Advertisement. The Pentagon Hammer System.

Jacobs Corporation; Hammermill Replacement Parts; Hammermill Make—Raymond; Dec. 1, 2000.

Technical Examination Report, Genesis3-USPA-0087-BR, Apr. 22, 2020.

Technical Examination Report, Genesis3-USPA-0087-BR, Jul. 7, 2019.

HAMMER

CROSS REFERENCE TO RELATED APPLICATIONS

The present non-provisional patent application claims priority from and is a continuation of U.S. patent application Ser. No. 17/499,249 filed on Oct. 12, 2021 (now U.S. Pat. No. 11,839,879), which non-provisional patent application claims priority from provisional patent App. No. 63/090,099 filed on Oct. 9, 2020, which application is incorporated by reference herein in its entirety.

FIELD OF INVENTION

This invention relates generally to a device for comminuting or grinding material. More specifically, various embodiments according to the present disclosure may be especially useful for use as a hammer in a rotatable hammermill assembly.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROND

A number of different industries rely on impact grinders or hammermills to reduce materials to a smaller size. For example, hammermills are often used to process forestry and agricultural products as well as to process minerals, and for recycling materials. Specific examples of materials processed by hammermills include grains, animal food, pet food, food ingredients, mulch and even bark. This invention although not limited to grains, has been specifically developed for use in the grain industry. Whole grain corn essentially must be cracked before it can be processed further. Dependent upon the process, whole corn may be cracked after tempering yet before conditioning. A common way to carry out particle size reduction is to use a hammermill where successive rows of rotating hammer like devices spinning on a common rotor next to one another comminute the grain product. For example, methods for size reduction as applied to grain and animal products are described in Watson, S. A. & P. E. Ramstad, ed. (1987, Corn: Chemistry and Technology, Chapter 11, American Association of Cereal Chemist, Inc., St. Paul, Minn), the disclosure of which is hereby incorporated by reference in its entirety. The application of the invention as disclosed and herein claimed, however, is not limited to grain products or animal products.

Hammermills are generally constructed around a rotating shaft that has a plurality of disks provided thereon. A plurality of free-swinging hammers are typically attached to the periphery of each disk using hammer rods extending the length of the rotor. With this structure, a portion of the kinetic energy stored in the rotating disks is transferred to the product to be comminuted through the rotating hammers. The hammers strike the product, driving into a sized screen, in order to reduce the material. Once the comminuted product is reduced to the desired size, the material passes out of the housing of the hammermill for subsequent use and further processing. A hammer mill will break up grain, pallets, paper products, construction materials, and small tree branches. Because the swinging hammers do not use a sharp edge to cut the waste material, the hammer mill is more suited for processing products which may contain metal or stone contamination wherein the product the may be commonly referred to as “dirty”. A hammer mill has the advantage that the rotatable hammers will recoil backwardly if the hammer cannot break the material on impact. One significant problem with hammer mills is the wear of the hammers over a relatively short period of operation in reducing “dirty” products which include materials such as nails, dirt, sand, metal, and the like. As found in the prior art, even though a hammermill is designed to better handle the entry of a “dirty” object, the possibility exists for catastrophic failure of a hammer causing severe damage to the hammermill and requiring immediate maintenance and repairs.

Hammermills may also be generally referred to as crushers—which typically include a steel housing or chamber containing a plurality of hammers mounted on a rotor and a suitable drive train for rotating the rotor. As the rotor turns, the correspondingly rotating hammers come into engagement with the material to be comminuted or reduced in size. Hammermills typically use screens formed into and circumscribing a portion of the interior surface of the housing. The size of the particulate material is controlled by the size of the screen apertures against which the rotating hammers force the material. Exemplary embodiments of hammermills are disclosed in U.S. Pat. Nos. 5,904,306; 5,842,653; 5,377,919; and 3,627,212.

The four metrics of strength, capacity, run time and the amount of force delivered are typically considered by users of hammermill hammers to evaluate any hammer to be installed in a hammermill A hammer to be installed is first evaluated on its strength. Typically, hammermill machines employing hammers of this type are operated twenty-four hours a day, seven days a week. This punishing environment requires strong and resilient material that will not prematurely or unexpectedly deteriorate. Next, the hammer is evaluated for capacity, or more specifically, how the weight of the hammer affects the capacity of the hammermill. The heavier the hammer, the fewer hammers that may be used in the hammermill by the available horsepower. A lighter hammer then increases the number of hammers that may be mounted within the hammermill for the same available horsepower. The more force that can be delivered by the hammer to the material to be comminuted against the screen increases effective comminution (i.e. cracking or breaking down of the material) and thus the efficiency of the entire comminution process is increased. In the prior art, the amount of force delivered is evaluated with respect to the weight of the hammer.

Finally, the length of run time for the hammer is also considered. The longer the hammer lasts, the longer the machine run time, the larger profits presented by continuous processing of the material in the hammermill through reduced maintenance costs and lower necessary capital inputs. The four metrics are interrelated and typically tradeoffs are necessary to improve performance. For example, to increase the amount of force delivered, the weight of the hammer could be increased. However, because the weight of the hammer increased, the capacity of the unit typically will be decreased because of horsepower limitations. There is a need to improve upon the design of hammermill hammers available in the prior art for optimization of the four (4) metrics listed above.

Free-Swinging Hammermill Assemblies

Rotatable hammermill assemblies as found in the prior art, which are well known and therefore not pictured herein, generally includes two end plates on each end with at least one interior plate positioned between the two end plates. The end plates include an end plate drive shaft hole and the interior plates include an interior plate drive shaft hole. A hammermill drive shaft passes through the end plate drive shaft holes and the interior plate drive shaft holes. The end plates and interior plates are affixed to the hammermill drive shaft and rotatable therewith.

Each end plate also includes a plurality of end plate hammer rod holes, and each interior plate includes a plurality of interior plate hammer rod holes. A hammer rod passes through corresponding end plate hammer rod holes and interior plate hammer rod holes. A plurality of hammers is pivotally mounted to each hammer rod. The hammers are typically oriented in rows along each hammer rod, and each hammer rod is typically oriented parallel to one another and to the hammermill drive shaft.

The hammermill assembly and various elements thereof rotate about the longitudinal axis of the hammermill drive shaft. As the hammermill assembly rotates, centrifugal force causes the hammers to rotate about the hammer rod to which each hammer is mounted. Free-swinging hammers are often used instead of rigidly connected hammers in case lodged metal, foreign objects, or other non-crushable material enters the housing with the particulate material to be reduced, which material may be a cereal grain For effective comminution in hammermill assemblies using free-swinging hammers, the rotational speed of the hammermill assembly must produce sufficient centrifugal force to hold the hammers as close to the fully extended position as possible when material is being communited. Depending on the type of material being processed, the minimum hammer tip speeds of the hammers are usually 5,000 to 11,000 feet per minute (FPM). In comparison, the maximum speeds depend on shaft and bearing design, but usually do not exceed 30,000 FPM. In special high-speed applications, the hammermill assemblies may be configured to operate up to 60,000 FPM.

In the case of disassembly for the purposes of repair and replacement of worn or damaged parts, the wear and tear causes considerable difficulty in realigning and reassembling the various elements of the hammermill assembly. Moreover, the elements of the hammermill assembly are typically keyed to one another, or at least to the hammermill drive shaft, which further complicates the assembly and disassembly process. For example, the replacement of a single hammer may require disassembly of the entire hammermill assembly. Given the frequency at which wear parts require replacement, replacement and repairs constitute an extremely difficult and time consuming task that considerably reduces the operating time of the size reducing machine.

BRIEF DESCRIPTION OF THE FIGURES

The accompanying drawings, which are incorporated in and constitute a part of this specification, illustrate embodiments and together with the description, serve to explain the principles of the methods and systems.

DETAILED DESCRIPTION—EXEMPLARY EMBODIMENTS

Figure 1:
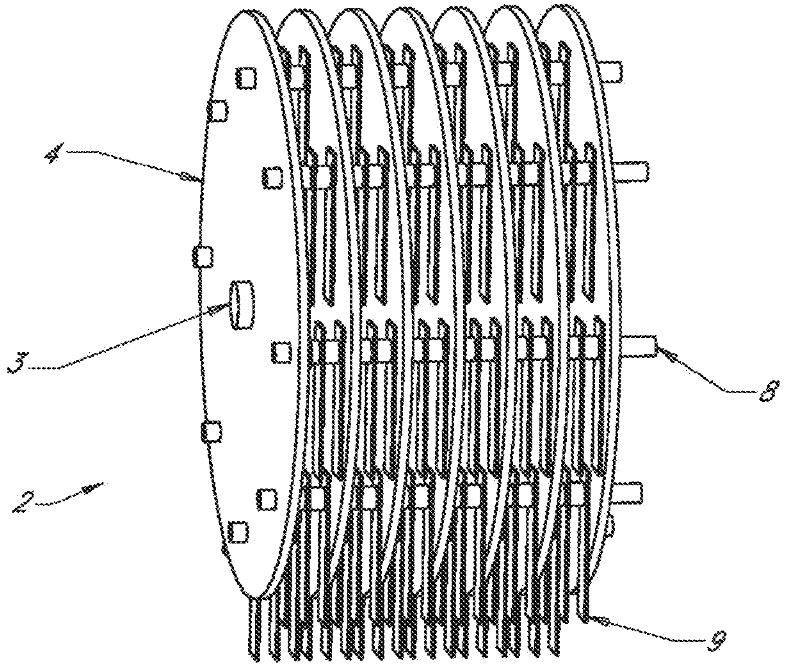
FIG. 1 (PRIOR ART)
FIG. 1 provides a perspective view of the internal configuration of a hammer mill at rest as commonly found in the prior art.

Before the present methods and apparatuses are disclosed and described, it is to be understood that the methods and apparatuses are not limited to specific methods, specific components, or to particular implementations. It is also to be understood that the terminology used herein is for the purpose of describing particular embodiments/aspects only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses.

These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION

| ELEMENT DESCRIPTION | ELEMENT NUMBER |
|---|---|
| Hammermill assembly | 2 |
| Hammermil drive shaft | 3 |
| End plate | 4 |
| End plate drive shaft hole | 5a |
| End plate hammer rod hole | 5b |
| Interior plate | 6 |
| Interior plate drive shaft hole | 7a |
| Interior plate hammer rod hole | 7b |
| Hammer rod | 8 |
| Spacer | 8a |
| Hammer (prior art) | 9 |
| Hammer body (prior art) | 9a |
| Hammer contact edge (prior art) | 9b |
| Hammer rod hole (prior art) | 9c |
| Notched hammer | 10 |
| Notched hammer neck | 11 |
| Neck void | 11a |
| Notched hammer first end | 12 |
| Notched hammer first shoulder | 14a |
| Notched hammer second shoulder | 14b |
| Notched hammer rod hole | 15 |
| Rod hole notch | 15a |
| Notched hammer second end | 16 |
| Hardened contact edge | 20 |
| First contact surface | 22a |
| First contact point | 22b |
| Second contact surface | 24a |
| Second contact point | 24b |
| Third contact surface | 26a |

-continued

| ELEMENT DESCRIPTION | ELEMENT NUMBER |
|---|---|
| Third contact point | 26b |
| Fourth contact point | 28 |
| Edge pocket | 29 |
| Multiple blade hammer | 30 |
| Multiple blade hammer neck | 31 |
| Multiple blade hammer first end | 32 |
| Multiple blade hammer first shoulder | 34a |
| Multiple blade hammer second shoulder | 34b |
| Multiple blade hammer rod hole | 35 |
| Multiple blade hammer second end | 36 |
| First blade | 37a |
| Second blade | 37b |
| Third blade | 37c |
| Blade edge | 38 |
| Dual-blade hammer | 110 |
| Connector end | 120 |
| Rod hole | 122 |
| First shoulder | 124a |
| Second shoulder | 124b |
| Notch | 126 |
| Neck | 130 |
| Neck first end | 132 |
| Neck second end | 134 |
| Neck recess | 136 |
| Neck edge | 138 |
| Contact end | 140 |
| First contact surface | 142a |
| Second contact surface | 142b |
| Interstitial area | 144 |
| Recess hammer | 150 |
| Recess hammer neck | 152 |
| Recess hammer connection end | 154 |
| Recess hammer rod hole | 154a |
| Recess hammer second end | 158 |
| Recess hammer cavity | 158a |
| Second end periphery | 158b |
| Double end hammer | 200 |
| Connection portion | 210 |
| Slot | 212 |
| Catch | 214 |
| Ridge | 216 |
| Contact end | 220 |
| Contact end periphery | 220a |
| Hammer cluster | 300 |
| Hammer | 310 |
| Connection portion | 312 |
| Connection aperture | 312a |
| Shoulder | 312b |
| Relief cavity | 313 |
| Tab | 314 |
| Neck | 315 |
| Contact portion | 316 |
| Collar | 320 |
| Collar gap | 321 |
| Collar edge | 322 |
| Spacer | 330 |
| Spacer cavity | 332 |

1. Free-Swinging Hammermill Assemblies

Figure 2:
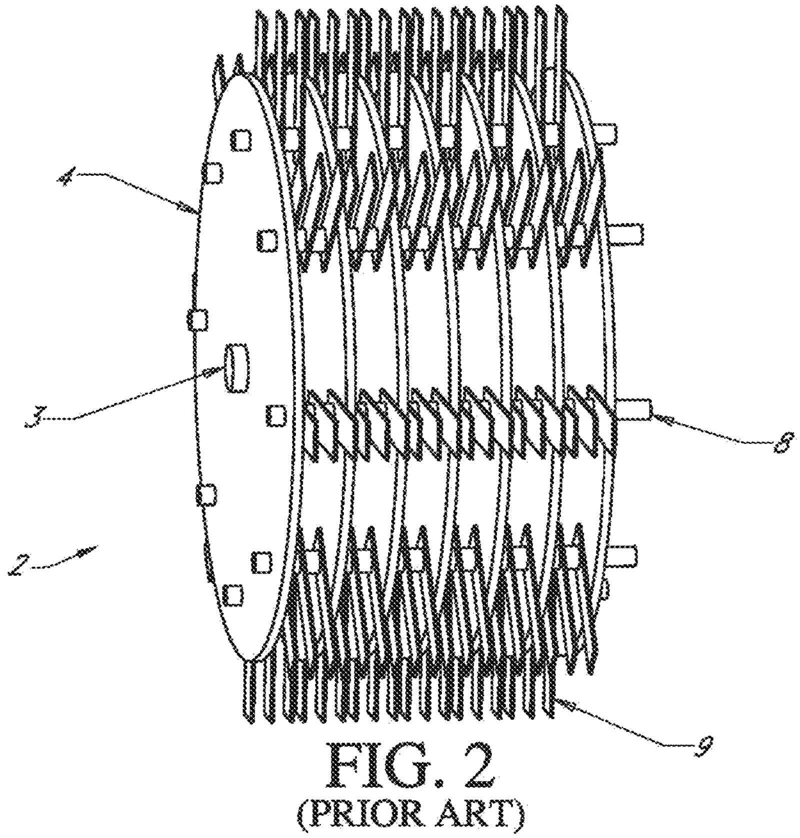
FIG. 2 (PRIOR ART)
FIG. 2 provides a perspective view of the internal configuration of a hammermill during operation as commonly found in the prior art.
Figure 3:
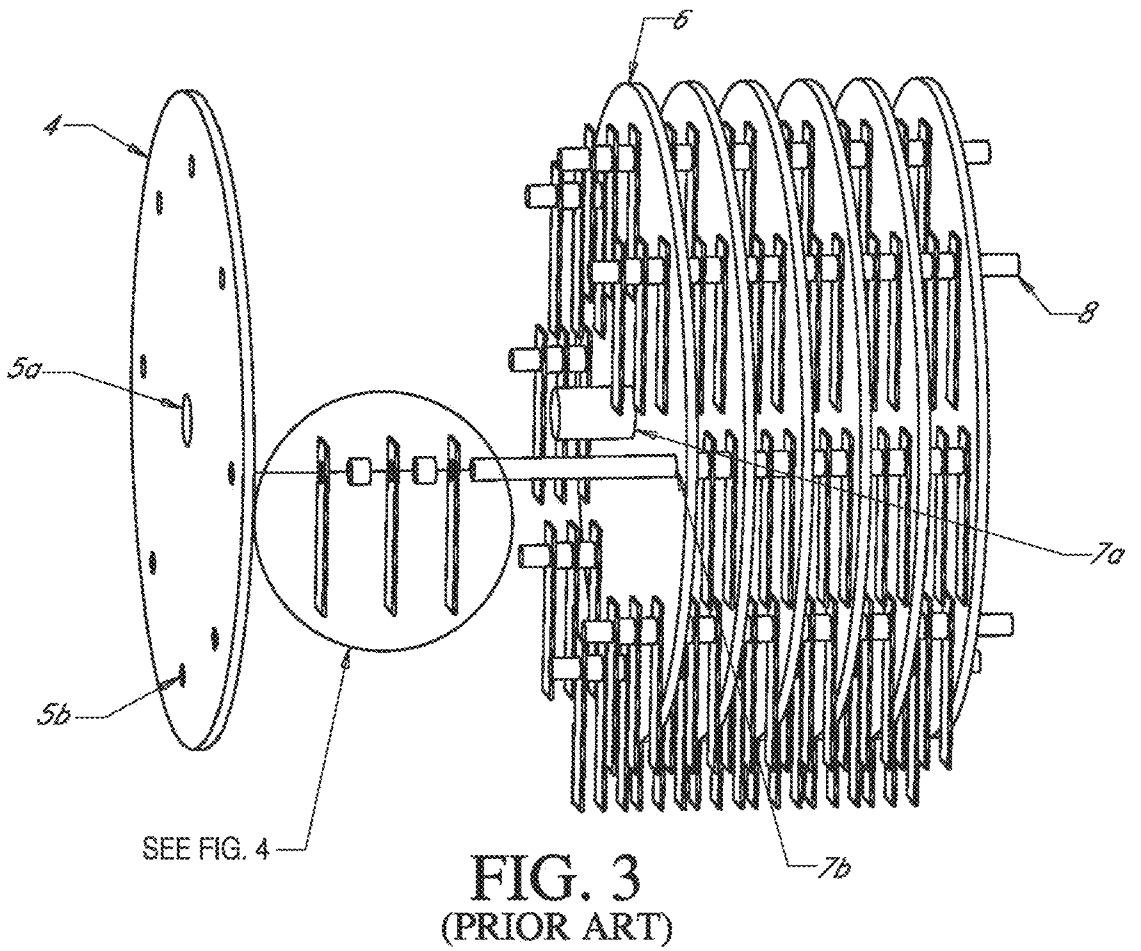
FIG. 3 (PRIOR ART)
FIG. 3 provides an exploded perspective view of a hammermill as found in the prior art as shown in FIG. 1.

Referring now to the drawings, wherein like reference numerals designate identical or corresponding parts throughout the several views, FIGS. 1-3 show a hammermill assembly 2 as found in the prior art. The hammermill assembly 2 includes two end plates 4 on each end with at least one interior plate 6 positioned between the two end plates 4. The end plates 4 include an end plate drive shaft hole 5*a* and the interior plates 6 include an interior plate drive shaft hole 7*a*. A hammermill drive shaft 3 passes through the end plate drive shaft holes 5*a* and the interior plate drive shaft holes 7*a*. The end plates 4 and interior plates 6 are affixed to the hammermill drive shaft and rotatable therewith.

Each end plate 4 also includes a plurality of end plate hammer rod holes 5*b*, and each interior plate 6 includes a plurality of interior plate hammer rod holes 7*b*. A hammer rod 8 passes through corresponding end plate hammer rod holes 5*b* and interior plate hammer rod holes 7*b*. A plurality of hammers 9 are pivotally mounted to each hammer rod 8, which is shown in detail in FIG. 4. The hammers 9 are typically oriented in rows along each hammer rod 8, and each hammer rod 8 is typically oriented parallel to one another and to the hammermill drive shaft 3.

Figure 4:
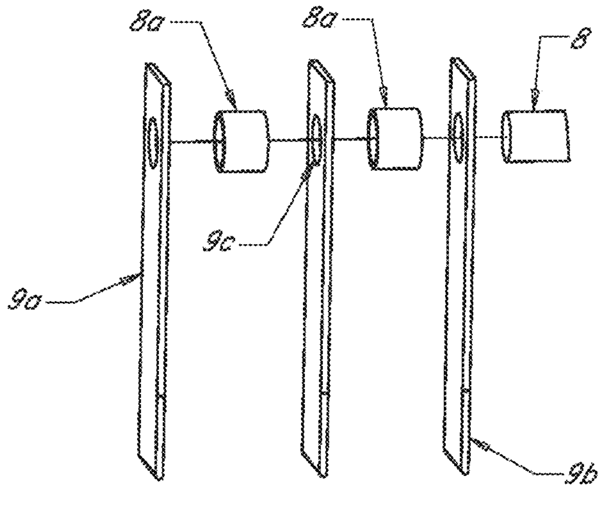
FIG. 4 (PRIOR ART)
FIG. 4 provides an enlarged perspective view of the attachment methods and apparatus as found in the prior art and illustrated in FIG. 3.

Each hammer 9 includes a hammer body 9*a*, hammer contact edge 9*b*, and a hammer rod hole 9*c* passing through the hammer body 9*a*, which is shown in detail in FIG. 4. Each hammer rod 8 passes through the hammer rod hole 9*c* of at least one hammer 9. Accordingly, the hammers 9 pivot with respect to the hammer rod 8 to which they are attached about the center of the hammer rod hole 9*c*. A spacer 8*a* may be positioned around the hammer rod 8 and between adjacent hammers 9 or adjacent hammers 9 and plates 4, 6 to better align the hammers 9 and/or plates 4, 6, which is best shown in FIGS. 3-4. As is well known to those of skill in the art, a lock collar (not shown) would typically be placed on the end of the hammer rod 8 to compress and hold the spacers 8*a* and the hammers 9 in alignment. All these parts require careful and precise alignment relative to one another. This type of hammer 9, which is shown affixed to the hammermill assembly 2 shown in FIGS. 1-3 and separately in FIG. 4, is commonly referred to as free-swinging hammers 9. Free-swinging hammers 9 are hammers 9 that are pivotally mounted to the hammermill assembly 9 in a manner as described above and are oriented outwardly from the center of the hammermill assembly 2 by centrifugal force as the hammermill assembly 2 rotates.

The hammermill assembly 2 and various elements thereof rotate about the longitudinal axis of the hammermill drive shaft 3. As the hammermill assembly 2 rotates, centrifugal force causes the hammers 9 to rotate about the hammer rod 8 to which each hammer 9 is mounted. The hammermill assembly 2 is shown at rest in FIG. 1 and in a dynamic state in FIG. 2, as in operation. Free-swinging hammers 9 are often used instead of rigidly connected hammers in case tramped metal, foreign objects, or other non-crushable material enters the housing with the particulate material to be reduced, such as grain.

For effective comminution in hammermill assemblies 2 using free-swinging hammers 9, the rotational speed of the hammermill assembly 2 must produce sufficient centrifugal force to hold the hammers 9 as close to the fully extended position as possible when material is being communited. Depending on the type of material being processed, the minimum hammer tip speeds of the hammers are usually 5,000 to 11,000 feet per minute ("FPM"). In comparison, the maximum speeds depend on shaft and bearing design, but usually do not exceed 30,000 FPM. In special high-speed applications, the hammermill assemblies 2 may be configured to operate up to 60,000 FPM.

In the case of disassembly for the purposes of repair and replacement of worn or damaged parts, the wear and tear causes considerable difficulty in realigning and reassembling the various elements of the hammermill assembly 2. Moreover, the elements of the hammermill assembly 2 are typically keyed to one another, or at least to the hammermill drive shaft 3, which further complicates the assembly and disassembly process. For example, the replacement of a single hammer 9 may require disassembly of the entire hammermill assembly 2. Given the frequency at which wear parts require replacement, replacement and repairs constitute an extremely difficult and time consuming task that considerably reduces the operating time of the size reducing machine. Removing a single damaged hammer 9 may take in excess of five (5) hours due to both the hammermill assembly 2 design and the realignment difficulties related to the problems caused by impact of debris with the non-impact surfaces of the hammermill assembly 2.

Another problem found in the prior art hammermill assemblies 2 shown in FIGS. 1-3 is exposure of a great deal of the surface area of the hammermill assembly 2 elements to debris. The end plates 4 and interior plates 6, spacers 8*a*, and hammers 9 are all subjected to considerable contact with the debris and material within the hammermill assembly 2. This not only creates excessive wear, but contributes to realignment difficulties by bending and damaging of the various elements of the hammermill assembly 2, which may be caused by residual impact. Thus, after a period of operation, prior art hammermill assemblies 2 become even more difficult to disassemble and reassemble. The problems related to comminution service and maintenance of hammermill assemblies 2 provides abundant incentive for improvement of hammers 9 to lengthen operational run times.

2. Illustrative Embodiments of Notched Hammer

Figure 6:
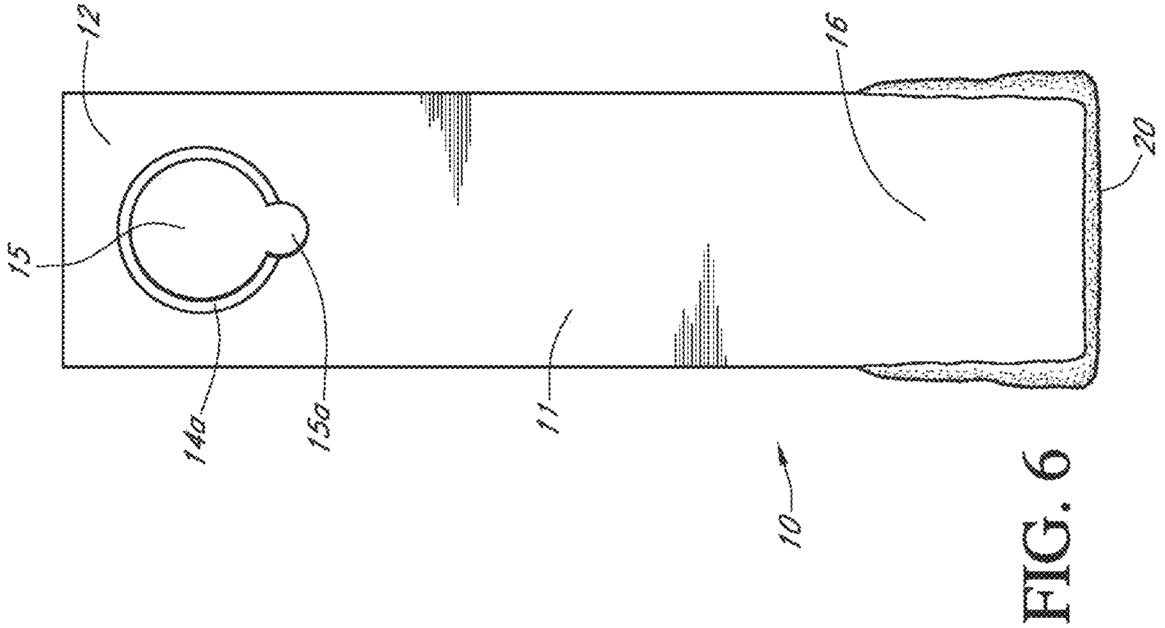
FIG. 6 provides a top view of the first embodiment of a notched hammer.
Figure 5:
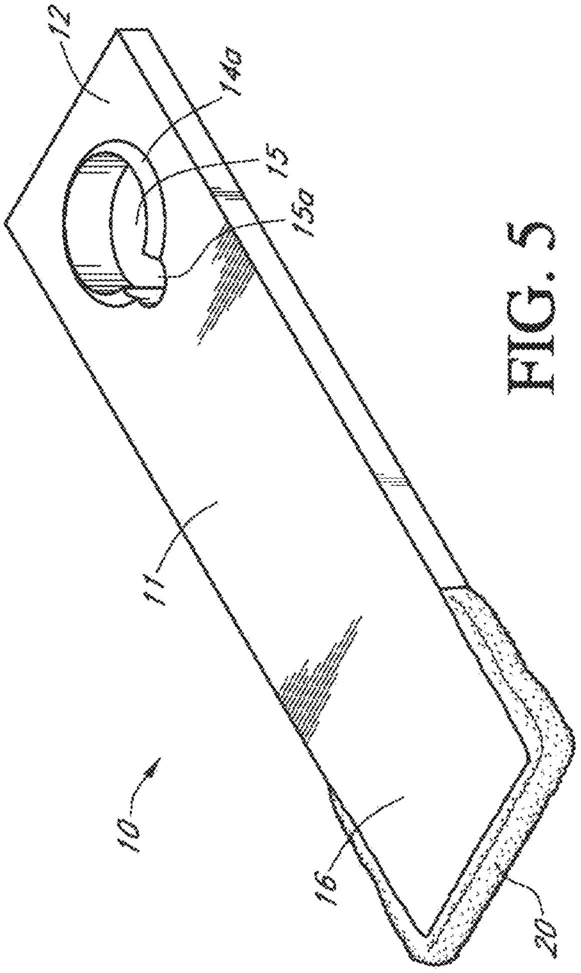
FIG. 5 provides a perspective view of a first embodiment of a notched hammer.

FIGS. 5-6 show a first embodiment of the notched hammer 10 for use in a rotatable hammermill assembly 2, which type of hammermill assembly 2 was previously described herein. The notched hammer 10 is comprised of a notched hammer first end 12 (also referred to herein occasionally as the securement end) for securement within the hammermill assembly 2 and a notched hammer second end 16 (also referred to herein occasionally as the contact end) for delivery of mechanical energy to and contact with the material to be comminuted. The notched hammer first end 12 is connected to the notched hammer second end 16 by a notched hammer neck 11. A notched hammer rod hole 15 is centered in the notched hammer first end 12 for engagement with and attachment of the notched hammer 10 to the hammer rod 8 of a hammermill assembly 2. Typically, the distance from the center of the notched hammer rod hole 15 to the most distal edge of the notched hammer second end 16 is referred to as the "hammer swing length."

Figure 7:
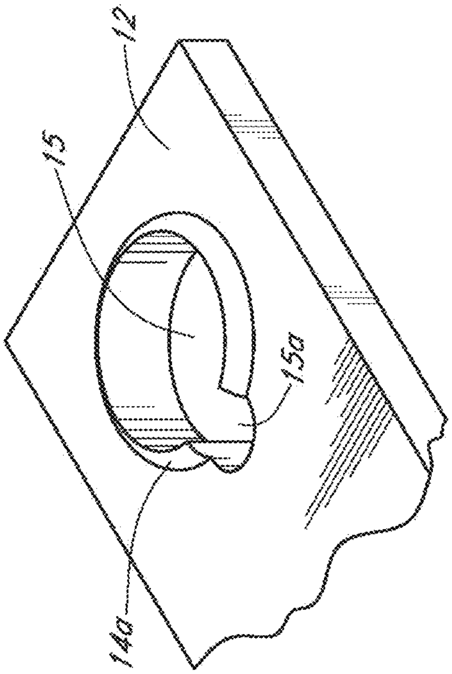
FIG. 7 provides a detailed perspective view of the rod hole of the first embodiment of a notched hammer.

As shown generally in FIGS. 5-6 and in detail in FIG. 7, at least one rod hole notch 15*a* is formed in the notched hammer rod hole 15. The at least one rod hole notch 15*a* transverses the length of the notched hammer rod hole 15 and is aligned with the notched hammer neck 11. As shown in the various embodiments pictured and described herein, the longitudinal axis of the rod hole notch 15*a* is parallel with the longitudinal axis of the notched hammer rod hole 15, but may have different orientations in embodiments not pictured or described herein, such as an embodiment wherein the rod hole notch 15*a* is not parallel to the longitudinal axis of the notched hammer rod hole 15. Furthermore, the cross-sectional shape of the rod hold notch 15*a* may be any shape, such as circular, oblong, angular, or any other shape known to those skilled in the art. Additionally, the cross-sectional shape of the rod hole notch 15*a* may vary along its length.

As shown in FIGS. 5-7, the sides of the notched hammer neck 11 in first embodiment of the notched hammer 10 are parallel, and the notched hammer rod hole 15 is surrounded by a notched hammer first shoulder 14*a*. The notched hammer first shoulder 14*a* is comprised of a raised, single uniform ring surrounding the notched hammer rod hole 15. The notched hammer first shoulder 14*a* thereby increased the material thickness around the notched hammer rod hole 15 as compared to the thickness of the notched hammer first end 12. The notched hammer first shoulder 14*a* increases the surface area available for distribution of the opposing forces placed on the notched hammer rod hole 15 during operation in an amount proportional to the width of the hammer. This increase in surface area allows for a longer useful life of the notched hammer 10 because the additional surface area works to decrease the amount of elongation of the notched hammer rod hole 15 while still allowing the notched hammer 10 to swing freely on the hammer rod 8 during operation. Other embodiments of the notched hammer 10 may not be configured with a notched hammer first shoulder 14*a*, and in still other embodiments the sides of the notched hammer neck 11 may be oriented other than parallel to one another.

The first embodiment of the notched hammer 10 also includes a hardened contact edge 20 welded on the periphery of the notched hammer second end 16. The hardened contact edge 20 is positioned on the portion of the notched hammer second end 16 that is most often in contact with the material to be comminuted during operation of the hammermill assembly 2. The hardened contact edge 20 may be comprised of any suitable material known to those skilled in the art, and it is contemplated that one such material is tungsten carbide. In other embodiments of the notched hammer 10 a hardened contact edge 20 is not positioned on the notched hammer second end 16.

Figure 8:
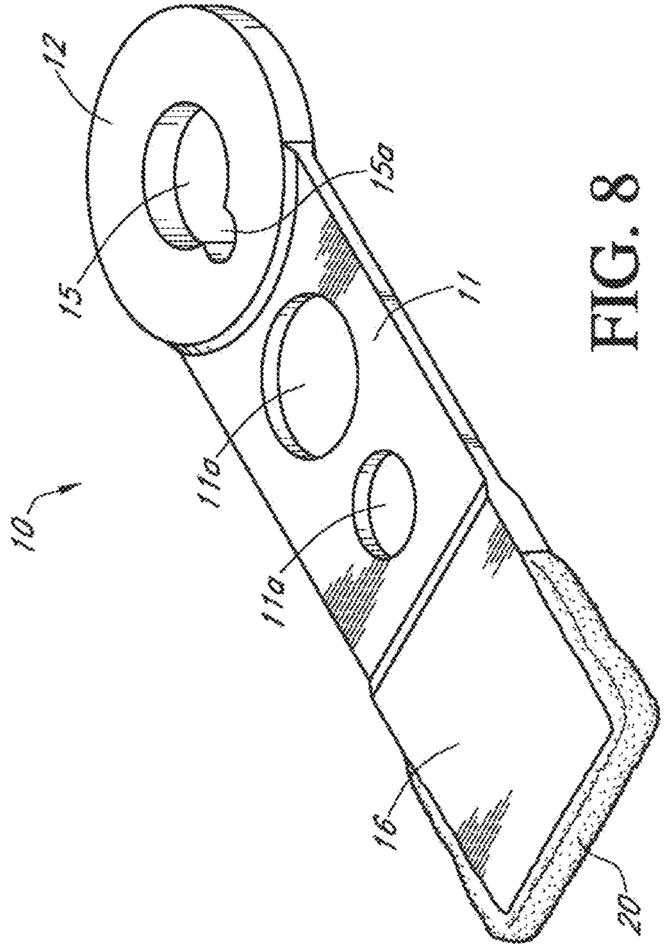
FIG. 8 provides a perspective view of a second embodiment of a notched hammer.

A second embodiment of the notched hammer 10 is shown in FIG. 8. In the second embodiment the notched hammer neck 11 includes a plurality of neck voids 11*a*. As shown in FIG. 8, the second embodiment includes two neck voids 11*a* that are both circular in shape but have different diameters from one another. The neck voids 11*a* may have any shape, and each neck void 11*a* may have a different shape than an adjacent neck void 11*a*. Furthermore, neck voids 11*a* may have perimeters of differing values, and the neck voids 11*a* need not be positioned along the center line of the notched hammer neck 11. More than two neck voids 11*a* may be used in any the second embodiment of the notched hammer 10. The neck voids 11*a* may be asymmetrical or symmetrical. As shown in FIG. 8, the circular nature of the neck voids 11*a* allows the transmission and dissipation of the stresses produced at the notched hammer first end 12 through and along the notched hammer neck 11.

The notched hammer neck 11 in the second embodiment is not as thick as the notched hammer first end 12 or the notched hammer second end 16. This configuration of the notched hammer neck 11 allows for reduction in the overall weight of the notched hammer 10, to which attribute the neck voids 11*a* also contribute. The mechanical energy imparted to the notched hammer second end 16 with respect to the mechanical energy imparted to the notched hammer neck 11 is also increased with this configuration. The neck voids 11*a* also allow for greater agitation of the material to be comminuted during operation of the hammermill assembly 2.

Figure 9:
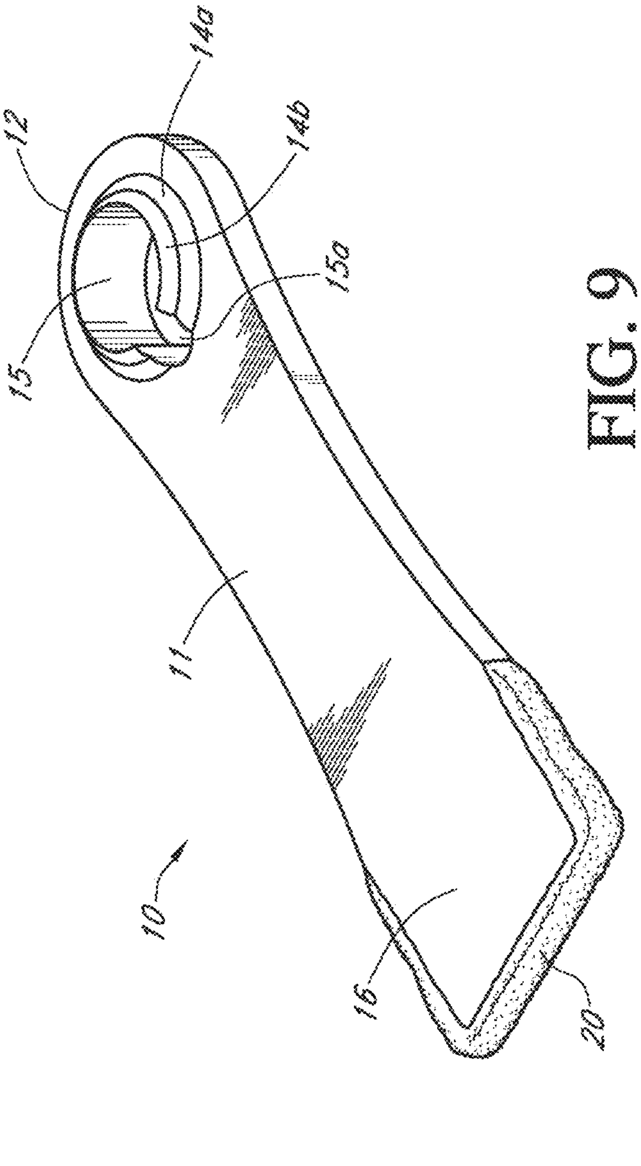
FIG. 9 provides a perspective view of a third embodiment of a notched hammer.

A third embodiment of the notched hammer 10 is shown in FIG. 9. The notched hammer rod hole 15 in the third embodiment includes a notched hammer first shoulder 14*a* and a notched hammer second shoulder 14*b* oriented symmetrically around the notched hammer rod hole 15. As explained in detail above for the first embodiment of the notched hammer 10, the first and second rod hole shoulders 14*a*, 14*b* allow the notched hammer rod hole 15 to resist elongation. In the third embodiment, the notched hammer second shoulder 14*b* is of a greater axial dimension than the notched hammer first shoulder 14*a* but of a lesser radial dimension, and both the notched hammer first and second shoulders 14*a*, 14*b* are symmetrical with respect to the notched hammer rod hole 15. This configuration increases the useful life of the notched hammer 10 while simultaneously allowing for decreased weight thereof since the portion of the notched hammer first end 12 not formed as either the notched hammer first or second shoulders 14*a*, 14*b* may be of the same thickness as the notched hammer neck 11 and notched hammer second end 16. The third embodiment is also show with a hardened contact edge 20 welded to the notched hammer second end 16, but other embodiments exist that do not have a hardened contact edge 20.

The edges of the notched hammer neck 11 in the third embodiment are non-parallel with respect to one another, and instead form an hourglass shape. This shape starts just below the notched hammer rod hole 15 and continues through the notched hammer neck 11 to the notched hammer second end 16. This hourglass shape yields a reduction in weight of the notched hammer 10 and also reduces the vibration of the notched hammer 10 during operation.

Figure 10:
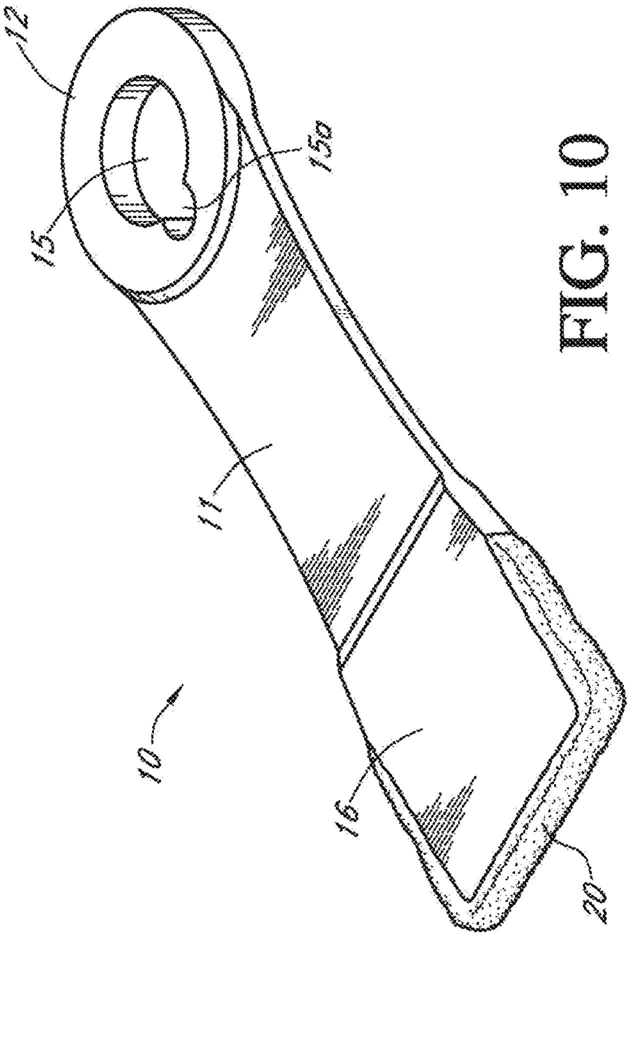
FIG. 10 provides a perspective view of a fourth embodiment of a notched hammer.

A forth embodiment of the notched hammer 10 is shown in FIG. 10, which most related to the second embodiment of the notched hammer 10 shown in FIG. 8. The fourth embodiment does not include neck voids 11*a*. As shown, the fourth embodiment provides the benefits of increasing the surface area available for distribution of the opposing forces placed on the notched hammer rod hole 15 in proportion to the thickness of the notched hammer neck 11 without using a notched hammer first or second shoulder 14*a*, 14*b*. As with some other embodiments disclosed and described herein, the fourth embodiment allows for decreased overall notched hammer 10 weight from the decreased thickness of notched hammer neck 11 while simultaneously reducing the likelihood of elongation of the notched hammer rod hole 15.

Figure 11:
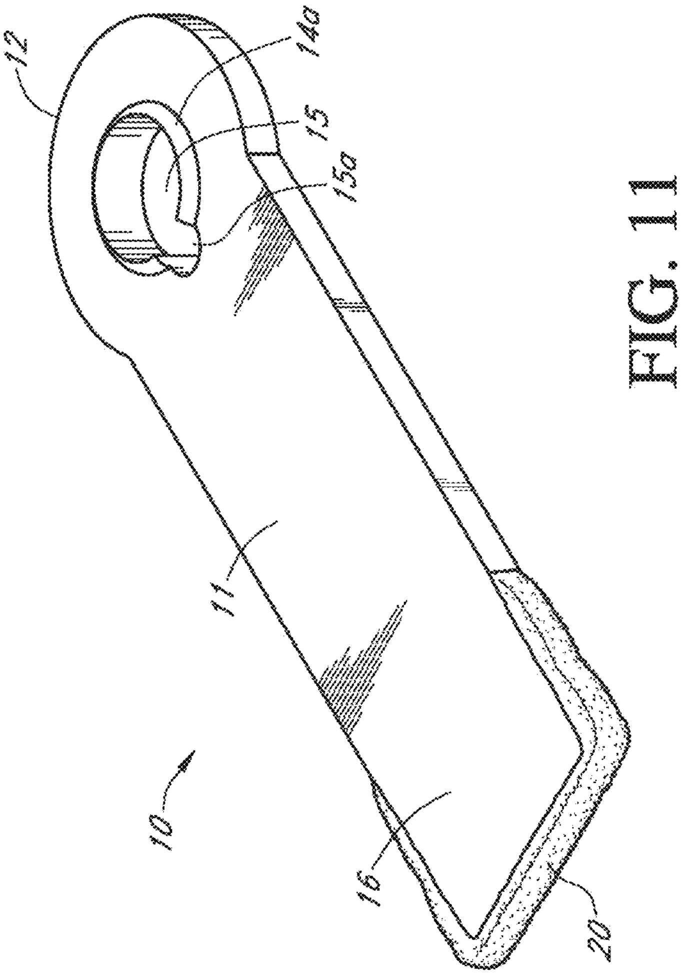
FIG. 11 provides a perspective view of a fifth embodiment of a notched hammer.

A fifth embodiment of the notched hammer is shown in FIG. 11. In the fifth embodiment, the thickness of the notched hammer first end 12, notched hammer neck 11, and notched hammer second end 16 are substantially similar A notched hammer first shoulder 14*a* is positioned around the periphery of the notched hammer rod hole 15 for additional strength and to reduce elongation thereof, as explained in detail above. Additionally, the fifth embodiment includes a hardened contact edge 20. The rounded shape of the notched hammer first end 12 strengthens the notched hammer first end 12 by improving the transmission of hammer rod 8 vibrations away from the notched hammer first end 12, through the notched hammer neck 11 to the notched hammer second end 16. The rounded shape also allows for overall weight reduction of the notched hammer 10. The edges of the notched hammer neck 11 are parallel in the fifth embodiment, but they may also be curved to create an hourglass shape as previously disclosed for other embodiments.

Figure 12:
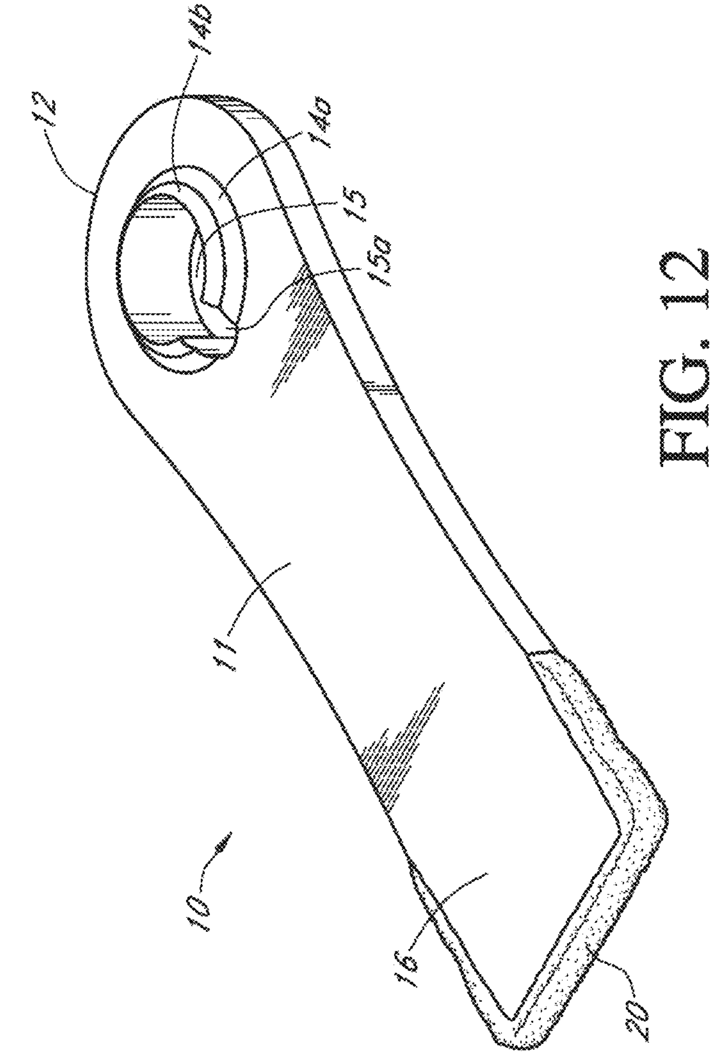
FIG. 12 provides a perspective view of a sixth embodiment of a notched hammer.

A sixth embodiment of the notched hammer is shown in FIG. 12. In this embodiment, notched hammer first and second shoulders 14*a*, 14*b* are positioned around the periphery of the notched hammer rod hole 15 to prevent elongation thereof. As with the fifth embodiment, the thickness of the notched hammer first end 12, notched hammer neck 11, and notched hammer second end 16 are substantially equal. The sixth embodiment also includes a hardened contact edge 20, and the edges of the notched hammer neck 11 are curved to improve vibration energy transfer as previously described for similar configurations.

Figure 13:
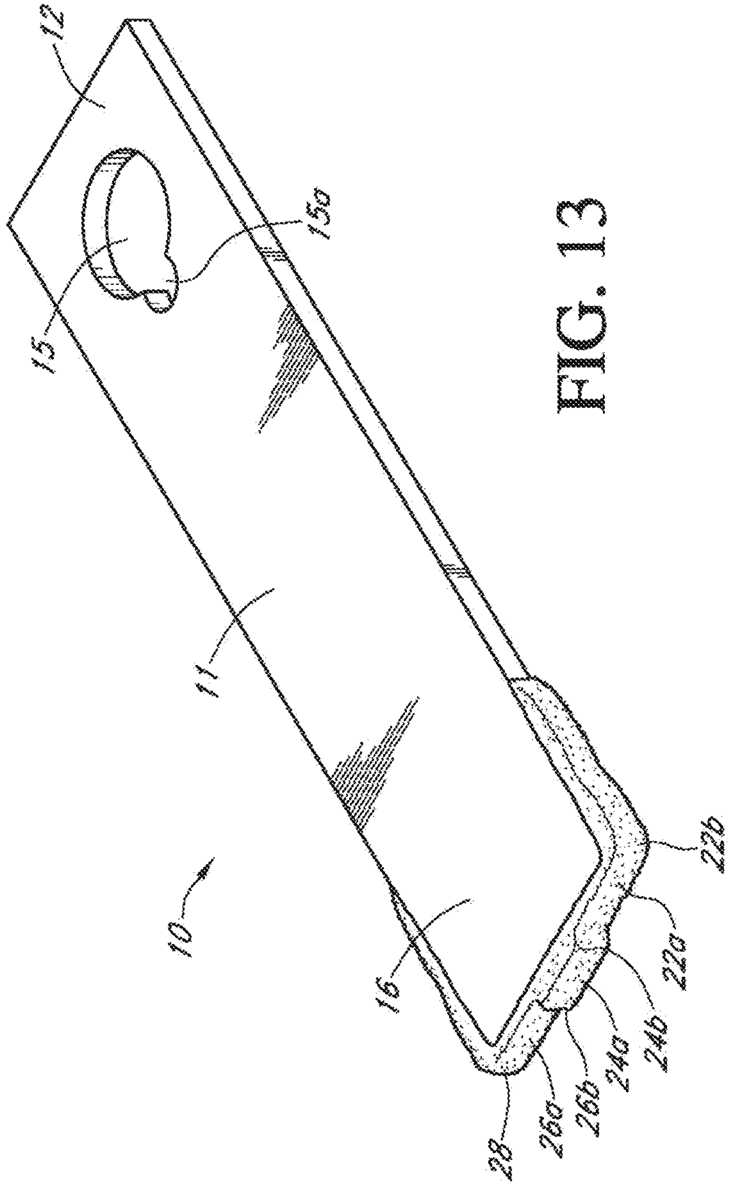
FIG. 13 provides a perspective view of a seventh embodiment of a notched hammer.

A seventh embodiment of the notched hammer is shown in FIG. 13. The notched hammer second end 16 of the seventh embodiment includes a plurality of contact surfaces 22*a*, 24*a*, and 26*a*, which increases the overall surface area available for contact with the material to be comminuted. The seventh embodiment includes a first, a second, and a third contact surface 22*a*, 24*a*, and 26*a*, respectively, which results in four distinct contact points—a first, second, third, and fourth contact points 22*b*, 24*b*, 26*b*, and 28.

During operation, two of the three contact surfaces 22*a*, 24*a*, 26*a* are working, depending on the direction of rotation of the notched hammer 10. The notched hammer 10 may be used bi-directionally by either changing the direction of rotation of the hammermill assembly 2 or by removing the notched hammer 10 and reinstalling it facing the opposite direction. For example, during normal operation in a first direction of rotation, primarily the first and second contact surfaces 22*a*, 24*a* will contact the material to be comminuted, and the first and second contact points 22*b*, 24*b* will likely comprise the primary working areas. Accordingly, the third contact surface 26*a* will be the trailing surface so that the third and fourth contact points 26*b*, 28 will exhibit very little wear.

If the direction of rotation of the notched hammer 10 is reversed either by reversing the direction of rotation of the hammermill assembly 10 or be reinstalling each notched hammer 10 in the opposite orientation, primarily the second and third contact surfaces 24*a*, 26*a* will contact the material to be communicated, and the third and fourth contact points 26*b*, 28 will likely comprise the primary working areas. Accordingly, the first contact surface 22*a* will be the trailing surface so that the first and second contact points 22*b*, 24*b* will likely exhibit very little wear.

The first, second, and third contact surfaces 22*a*, 24*a*, 26*a* are symmetrical with respect to the notched hammer 10 in the seventh embodiment. In the seventh embodiment, the linear distance from the center of the notched hammer rod hole 15 to the first, second, third, and fourth contact points 22*b*, 24*b*, 26*b*, 28, respectively, is equal. However, in other embodiments not pictured herein those distances may be different, or the contact surfaces 22*a*, 24*a*, 26*a*, and/or the contact points 22*b*, 24*b*, 26*b*, 28 may be different. In such embodiments the contact surfaces 22*a*, 24*a*, 26*a* are not symmetrical. In still other embodiments not pictured herein, the notched hammer 10 includes only two contact surfaces 22*a*, 24*a*, or more than three contact surfaces. Accordingly, the precise number of contact surfaces used in any embodiment of the notched hammer 10 in no way limits the scope of the notched hammer 10.

In the seventh embodiment, the thickness of the notched hammer first end 12, notched hammer neck 11, and notched hammer second end 16 is substantially equal. Furthermore, a hardened contact edge 20 has been welded to the notched hammer second end 16 to cover the first, second, and third contact surfaces 22*a*, 24*a*, 26*a*.

Figure 14:
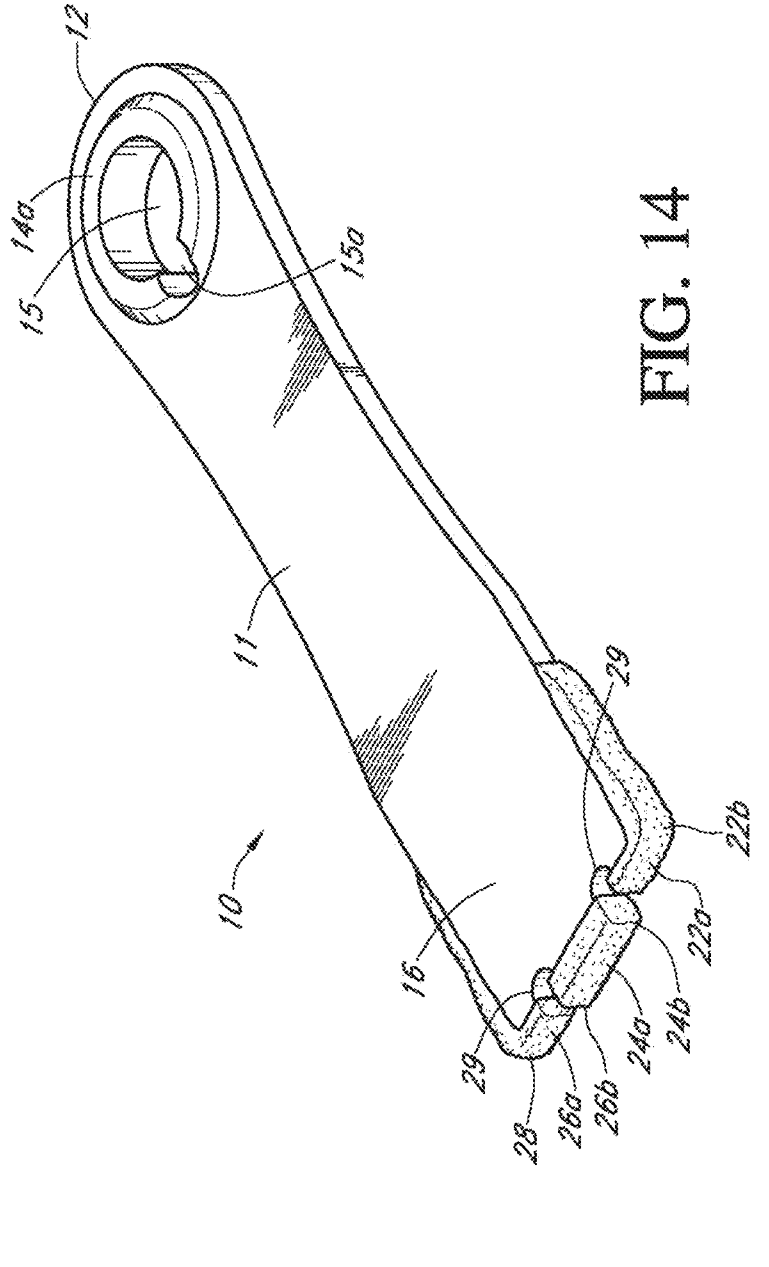
FIG. 14 provides a perspective view of an eighth embodiment of a notched hammer.

An eighth embodiment of the notched hammer 10 is shown in FIG. 14. This embodiment is similar to the seventh embodiment in that notched hammer second end 16 of the eighth embodiment includes three distinct contact surfaces 22*a*, 24*a*, 26*a*, and four distinct contact points 22*b*, 24*b*, 26*b*, 28. However, the notched hammer second end 16 in the eighth embodiment also includes a plurality of edge pockets 29. Each edge pocket 29 is a cutaway portion placed one of the contact surfaces 22*a*, 24*a*, 26*a*. In the eighth embodiment two edge pockets 29 are positioned on the notched hammer second end 16 symmetrically about either side of the second contact surface 24*a*. In other embodiments, the edge pockets 29 are not symmetrically positioned on the notched hammer second end 16, and the number of edge pockets 29 in no way limits the scope of the notched hammer 10. The edge pockets allow temporary insertion of "pocketing" of the material to be comminuted during rotation of the hammermill assembly 2 to increase loading upon the contact surfaces 22*a*, 24*a*, 26*a*, and thereby increase the contact efficiency between the notched hammer 10 and the material to be comminuted.

The depth of each edge pocket 29 may be proportional to the difference between the hammer swing length and the distance from the center of the notched hammer rod hole 15 to the first and third contact surfaces 22*a*, 26*a*. In many applications the depth of the edge pocket 29 is from 0.25 to twice the thickness of the notched hammer first end 12. The shape of the edge pocket 29 may be rounded, as shown in FIG. 14, or it may be angular in embodiments not pictured herein. Furthermore, the edge pockets 29 may be tapered so that the thickness thereof is not constant. The eight embodiment includes a hardened contact edge 20. It also includes notched hammer first and second shoulders 14*a*, 14*b*, and the edges of the notched hammer neck 11 are curved so that the notched hammer 10 is shaped similar to an hourglass.

Figure 15:
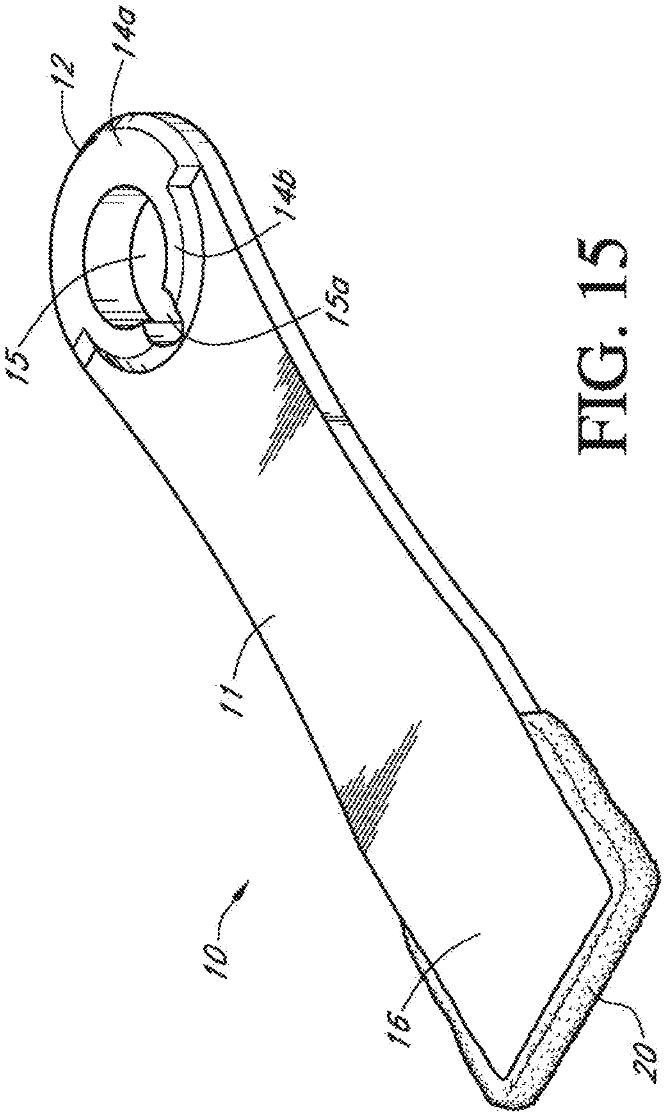
FIG. 15 provides a perspective view of a ninth embodiment of a notched hammer.

A ninth embodiment of the notched hammer 10 is shown in FIG. 15. In this embodiment, the thickness of the notched hammer first end 12, notched hammer neck 11, and notched hammer second end 16 are substantially equal. The ninth embodiment includes notched hammer first and second shoulders 14*a*, 14*b* positioned around the periphery of the notched hammer rod hole 15. However, unlike other embodiments previously described and disclosed herein, the notched hammer first and second shoulders 14*a*, 14*b* in the ninth embodiment are not symmetrical with respect to the notched hammer rod hole 15. This allows for overall weight and material reduction of the notched hammer 10 while still providing the benefits of reinforcement around the periphery of the notched hammer rod hole 15 provided by notched hammer shoulders 14*a*, 14*b* as previously described in detail. The ninth embodiment also includes a hardened contact edge 20, and the edges of the notched hammer neck 11 are curved.

The various features and or elements that differentiate one embodiment of the notched hammer 10 from another embodiment may be added or removed from various other embodiments to result in a nearly infinite number of embodiments. Whether shown in the various figures herein, all embodiments may include a notched hammer first shoulder 14*a* alone or in combination with a notched hammer second shoulder 14*a* having an infinite number of configurations, which may or may not be symmetrical with one another and/or the notched hammer rod hole 15. Furthermore, any embodiment may have notched hammer first and/or second shoulders 14*a*, 14*b* on both sides of the notched hammer 10.

Other features/configurations that may be included on any embodiments alone or in combination include: (1) curved or straight edges on the notched hammer neck 11; (2) reduced thickness of the notched hammer neck 11 with respect to the notched hammer first end 12 and/or notched hammer second end 16; (3) curved or angular notched hammer first ends 12; (4) hardened contact edges 20; (5) neck voids 11*a*; (6) multiple contact points; (7) multiple contact surfaces; (8) edge pockets 29; and, (9) multiple blades, which is described in detail below, or any combinations thereof. Furthermore, any embodiment may be bidirectional. Any embodiment of the notched hammer 10 may be heat treated if such heat treatment will impart desirable characteristics to the notched hammer 10 for the particular application.

In embodiments of the notched hammer 10 having a notched hammer neck 11 that is reduced in width (i.e., wherein the edges are curved) or thickness, it is contemplated that the notched hammer 10 will be manufactured by forging the steel used to produce the notched hammer 10. This is because forging typically in a finer grain structure that is much stronger than casting the notched hammer 10 from steel or rolling it from bar stock as found in the prior art. However, the notched hammer 10 is not so limited by the method of construction, and any method of construction known to those of ordinary skill in the art may be used including casting, rolling, stamping, machining, and welding.

Another benefit of some of the embodiments of the notched hammer 10 is that the amount of surface area supporting attachment of the notched hammer 10 to the hammer rod 8 is dramatically increased. This eliminates or reduces the wear or grooving of the hammer rod 8 caused by rotation of the notched hammer 10 during use. The ratio of surface area available to support the notched hammer 10 to the weight and/or overall thickness of the notched hammer 10 may be optimized with less material using various embodiments disclosed herein. Increasing the surface area available to support the notched hammer 10 on the hammer rod 8 while improving securement of the notched hammer 10 to the hammer rod 8 also increases the amount of material in the notched hammer 10 available to absorb or distribute operational stresses while still providing the benefits of the free-swinging hammer design (i.e., recoil to non-destructible foreign objects).

Embodiments of the notched hammer 10 having only a notched hammer first shoulder 14*a* or notched hammer first and second shoulders 14*a*, 14*b* (oriented either non-symmetrical with respect to the notched hammer rod hole 15, such as the ninth embodiment shown in FIG. 15 or symmetrical, such as the third, sixth, or eighth embodiments, shown in FIGS. 9, 12, and 14, respectively) may be especially useful with the rod hole notch 15*a*. In such embodiments it is contemplated that the thickness of the notched hammer first and second shoulders 14*a*, 14*b* will be 0.5 inches or greater, but may be less for other embodiments.

It should be noted that the present invention is not limited to the specific embodiments pictured and described herein, but is intended to apply to all similar apparatuses for improving hammermill hammer structure and operation. Modifications and alterations from the described embodiments will occur to those skilled in the art without departure from the spirit and scope of the notched hammer 10.

3. Illustrative Embodiments of Multiple Blade Hammer

Several exemplary embodiments of a multiple blade hammer 30 will now be described. The preferred embodiment will vary depending on the particular application for the multiple blade hammer 30, and the exemplary embodiments described and disclosed herein represent just some of an infinite number of variations to the multiple blade hammer 30 that will naturally occur to those skilled in the art.

Figure 16:
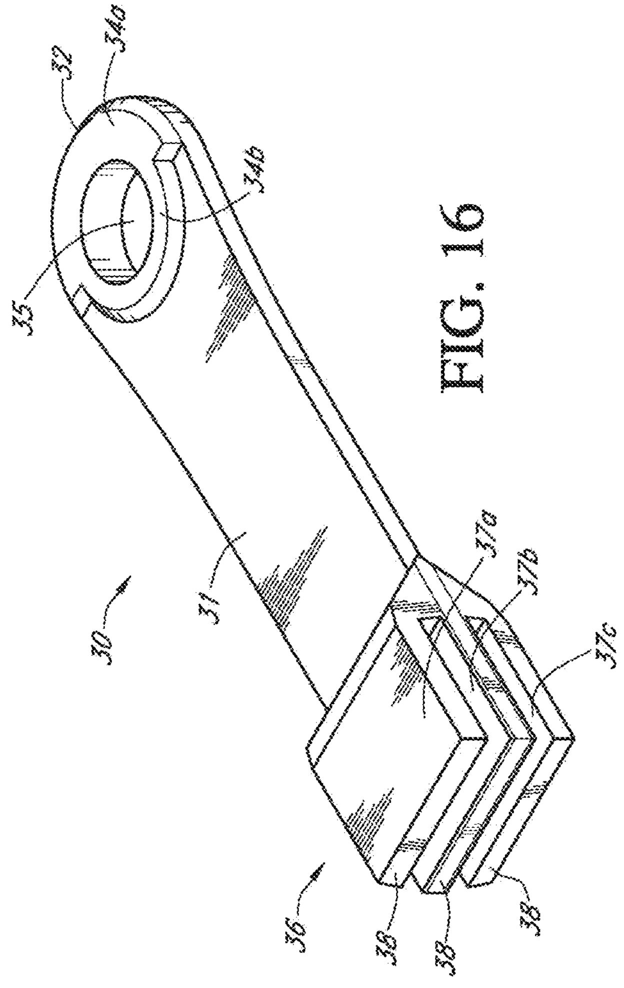
FIG. 16 provides a perspective view of a first embodiment of a multiple blade hammer.

A perspective view of a first embodiment of a multiple blade hammer 30 is shown in FIG. 16. The first embodiment is a metallic-based multiple blade hammer 30 for use in a rotatable hammermill assembly 2 as shown in FIGS. 1-3. Other embodiments of the multiple blade hammer 30 for use with types of hammermill assemblies other than that shown and described herein are included within the scope of the multiple blade hammer 30.

Figure 17:
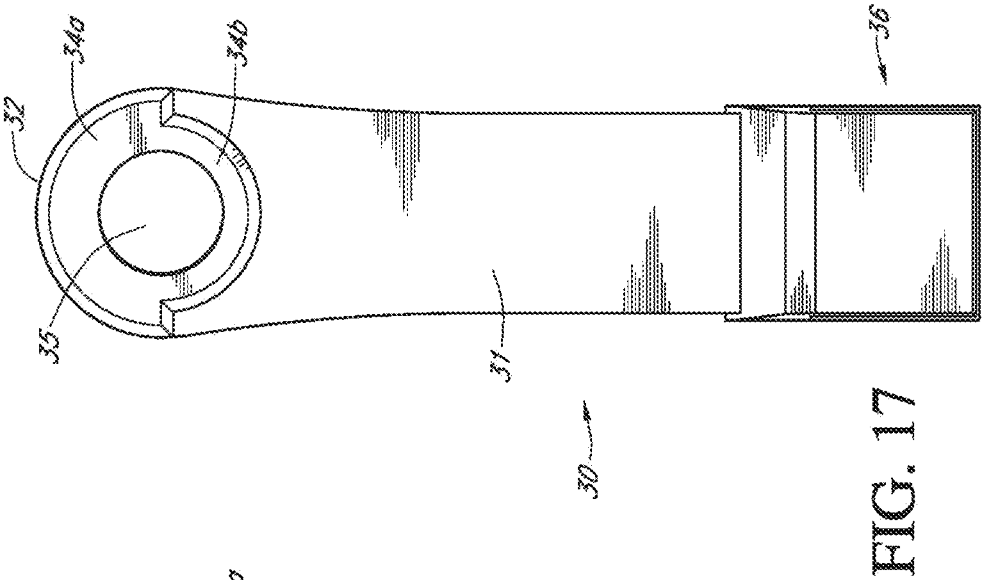
FIG. 17 provides a top view of the first embodiment of a multiple blade hammer.

The multiple blade hammer 30 includes a multiple blade hammer first end 32 and a multiple blade hammer second end 36, which are connected to one another via a multiple blade hammer neck 11. The multiple blade hammer 30 in the first embodiment includes a multiple blade hammer rod hole 35 formed in the multiple blade hammer first end 32. Multiple blade hammer first and second shoulders 34*a*, 34*b* both surround the multiple blade hammer rod hold 35, which is shown most clearly in FIGS. 16 and 17. In this respect, the multiple blade hammer first end 32 is configured in a very similar manner to the notched hammer first end 12 in the ninth embodiment thereof, which is shown in FIG. 15. Accordingly, the multiple blade hammer first and second shoulders 34*a*, 34*b* in the first embodiment of the multiple blade hammer 30 are not symmetrical with respect to the multiple blade hammer rod hole 35.

In other embodiments of the multiple blade hammer 30 not pictured herein, the multiple blade hammer first and second shoulders 34*a*, 34*b* may be symmetrical with respect to the multiple blade hammer rod hole 35. In such embodiments of the multiple blade hammer 30, the multiple blade hammer first end 32 would be configured in a manner similar to the notched hammer first end 12 in the third embodiment thereof, which is shown in FIG. 9. In other embodiment of the multiple blade hammer 30 not pictured herein, only a first multiple blade hammer shoulder 34*a* may surround the multiple blade hammer rod hole 35. In such embodiments of the multiple blade hammer 30, the multiple blade hammer first end 32 would be configured in a manner similar to the notched hammer first end 12 in the first embodiment thereof, which is shown in FIG. 5. In still other embodiments of the multiple blade hammer 30 not pictured herein, the multiple blade hammer neck 31 is reduced in thickness compared to the thickness of the multiple blade hammer first end 32. In such embodiments of the multiple blade hammer 30, the multiple blade hammer first end 32 would be configured in a manner similar to the notched hammer first end 12 in the second embodiment thereof, which is shown in FIG. 8. Accordingly, it will become apparent to those skilled in the art in light of the present disclosure that the multiple blade hammer first end 32 may include a multiple blade hammer first shoulder 34*a* and/or a multiple blade hammer second shoulder 34*b*, both of which may be in any configuration/orientation disclosed for the notched hammer 10.

The multiple blade hammer second end 36, which is the contact end, in the first embodiment includes a first, second, and third blade 37*a*, 37*b*, 37*c*. These three blades 37*a*, 37*b*, 37*c* provide for three distinct contact surfaces in the axial direction, which is best seen in FIG. 16. The multiple blade hammer second end 36 provides for contact and delivery of momentum to material to be comminuted. The multiple blade hammer second end 36 includes at least two blades 37*a*, 37*b*, and in the first embodiment pictured herein includes three blades 37*a*, 37*b*, 37*c*. Accordingly, the multiple blade hammer 30 may be configured with two or more blades 37*a*, 37*b*, 37*c* depending on the particular application, and the scope of the multiple blade hammer 30 extends to any hammer having two or more blades 37*a*, 37*b*, 37*c*. The at least two blades 4 have combined width greater than the width of the multiple blade hammer first end 32. The distance between the blades 37*a*, 37*b*, 37*c* will vary depending on the specific application of the multiple blade hammer 30, and in the first embodiment the distance between the blades 37*a*, 37*b*, 37*c* is approximately equal to the thickness of the blades 37*a*, 37*b*, 37*c*, which is approximately one-fourth of an inch. However, the particular dimensions and/or orientation of the blades 37*a*, 37*b*, 37*c* is in no way limiting.

In other embodiments not pictured herein, the multiple blade hammer 30 structure may undergo further manufacturing work and have tungsten carbide welded to the periphery of each of the hammer blades 37*a*, 37*b*, 37*c* for increased hardness and abrasion resistance. Furthermore, the multiple blade hammer first end 32, second end 36, and neck 31 may be heat-treated for hardness. It is contemplated that in many embodiments of the multiple blade hammer 30 it will be beneficial to construct the multiple blade hammer 30 using forging techniques. However, the scope of the multiple blade hammer 30 is not so limited, and other methods of construction known to those of ordinary skill in the art may be used including casting, machining and welding.

In other embodiments of the multiple blade hammer 30 not pictured herein, the multiple blade hammer 30 may have neck voids 11*a* placed in the multiple blade hammer neck 31. In still other embodiments of the multiple blade hammer 30 not pictured herein, the thickness of the multiple blade hammer neck 31 may be less than the thickness of either the multiple blade hammer first end 32 or second end 36. In such embodiments of the multiple blade hammer 30, the multiple blade hammer first end 32 and neck 31 would be configured substantially similar to the notched hammer first end 12 and 11 in the fourth embodiment thereof, which is shown in FIG. 10.

In still other embodiments of the multiple blade hammer 30 not pictured herein, each blade 37*a*, 37*b*, 37*c* may be configured to have more than one distinct contact point. In such embodiments of the multiple blade hammer 30, each blade 37*a*, 37*b*, 37*c* would be configured substantially similar to the notched hammer second end 16 in the seventh embodiment thereof, which is shown in FIG. 13. Edge pockets 29 may be positioned in any of the blades 37*a*, 37*b*, 37*c* in variations of such embodiments, the configuration of which is not limiting to the scope of the multiple blade hammer 30 in any way, and may vary in a manner previously explained for the eighth embodiment of the notched hammer 10.

Figure 18:
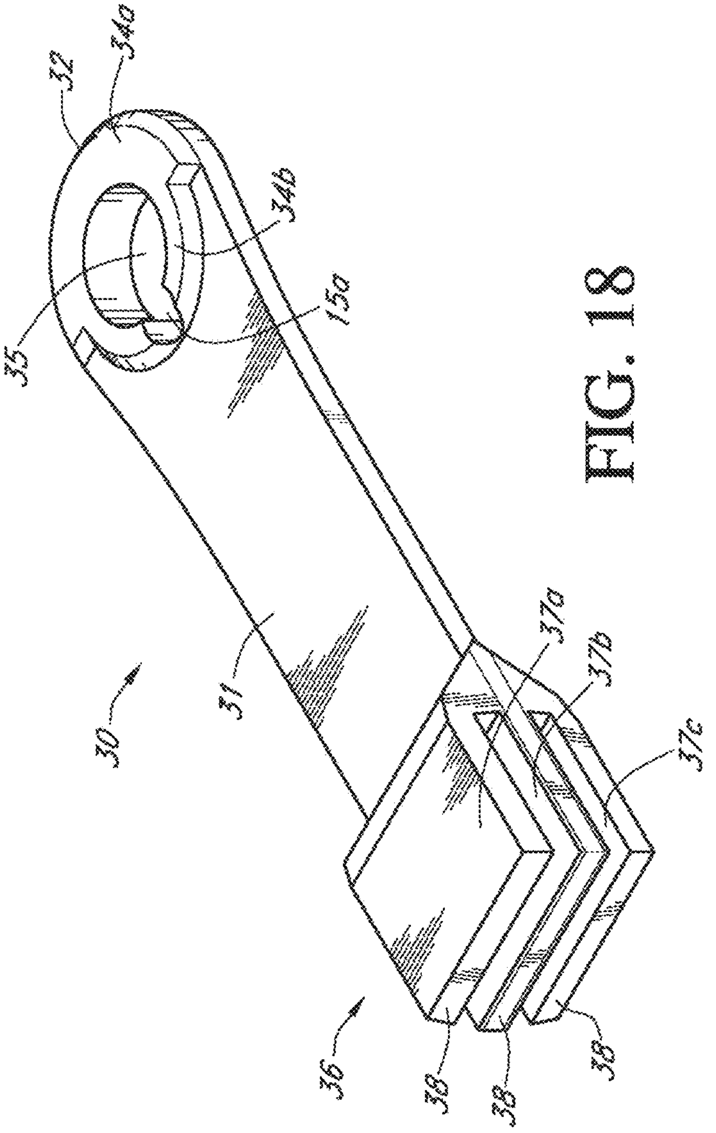
FIG. 18 provides a perspective view of a second embodiment of a multiple blade hammer.

A second embodiment of the multiple blade hammer 30 is shown in FIG. 18. In the second embodiment the multiple blade hammer rod hole 35 is formed with at least one rod hole notch 15 The at least one rod hole notch 15*a* transverses the length of the multiple blade hammer rod hole 35 and is aligned with the multiple blade hammer neck 31. As shown in FIG. 18, the longitudinal axis of the rod hole notch 15*a* is parallel with the longitudinal axis of the multiple blade hammer rod hole 35, but may have different orientations in embodiments not pictured or described herein, such as an embodiment wherein the rod hole notch 15*a* is not parallel to the longitudinal axis of the multiple blade hammer rod hole 15. Furthermore, the cross-sectional shape of the rod hold notch 15*a* may be any shape, such as circular, oblong, angular, or any other shape known to those skilled in the art. Additionally, the cross-sectional shape of the rod hole notch 15*a* may vary along its length.

The various features and or elements that differentiate one embodiment of the multiple blade hammer 30 from another embodiment may be added or removed from various other embodiments to result in a nearly infinite number of embodiments. Whether shown in the various figures herein, all embodiments may include a multiple blade hammer first shoulder 34*a* alone or in combination with a multiple blade hammer second shoulder 34*a* having an infinite number of configurations, which may or may not be symmetrical with one another and/or the multiple blade hammer rod hole 35. Furthermore, any embodiment may have multiple blade hammer first and/or second shoulders 34*a*, 34*b* on both sides of the multiple blade hammer 30.

Other features/configurations that may be included on any embodiments alone or in combination include: (1) curved or straight edges on the multiple blade hammer neck 31; (2) reduced thickness of the multiple blade hammer neck 31 with respect to the multiple blade hammer first end 32 and/or any blades 37*a*, 37*b*, 37*c*; (3) curved or angular multiple blade hammer first ends 32; (4) hardened contact edges 20 positioned on and/or adjacent to the blade edges 38; (5) neck voids 11*a*; (6) multiple contact points on any blade 37*a*, 37*b*, 37*c*; (7) multiple contact surfaces; (8) edge pockets 29; and, (9) multiple blades 37*a*, 37*b*, 37*c*, which is described in detail below, or any combinations thereof. Furthermore, any embodiment may be bidirectional. Any embodiment of the multiple blade hammer 30 may be heat treated if such heat treatment will impart desirable characteristics to the multiple blade hammer 30 for the particular application.

In embodiments of the multiple blade hammer 30 having a multiple blade hammer neck 31 that is reduced in width (i.e., wherein the edges are curved) or thickness, it is contemplated that the multiple blade hammer 30 will be manufactured by forging the steel used to produce the multiple blade hammer 30. This is because forging typically in a finer grain structure that is much stronger than casting the multiple blade hammer 30 from steel or rolling it from bar stock as found in the prior art. However, the multiple blade hammer 30 is not so limited by the method of construction, and any method of construction known to those of ordinary skill in the art may be used including casting, rolling, stamping, machining, and welding.

Another benefit of some of the embodiments of the multiple blade hammer 30 is that the amount of surface area supporting attachment of the multiple blade hammer 30 to the hammer rod 8 is dramatically increased. This eliminates or reduces the wear or grooving of the hammer rod 8 caused by rotation of the multiple blade hammer 30 during use. The ratio of surface area available to support the multiple blade hammer 30 to the weight and/or overall thickness of the multiple blade hammer 30 may be optimized with less material using various embodiments disclosed herein. Increasing the surface area available to support the multiple blade hammer 30 on the hammer rod 8 while improving securement of the multiple blade hammer 30 to the hammer rod 8 also increases the amount of material in the multiple blade hammer 30 available to absorb or distribute operational stresses while still providing the benefits of the free-swinging hammer design (i.e., recoil to non-destructible foreign objects).

Embodiments of the multiple blade hammer 30 having only a multiple blade hammer first shoulder 34*a* or multiple blade hammer first and second shoulders 34*a*, 34*b* (oriented either non-symmetrical with respect to the multiple blade hammer rod hole 35 or symmetrical) may be especially useful with the rod hole notch 15*a*. In such embodiments it is contemplated that the thickness of the multiple blade hammer first and second shoulders 34*a*, 34*b* will be 0.5 inches or greater, but may be less for other embodiments.

It should be noted that the present invention is not limited to the specific embodiments pictured and described herein, but is intended to apply to all similar apparatuses for improving hammermill hammer structure and operation. Modifications and alterations from the described embodiments will occur to those skilled in the art without departure from the spirit and scope of the multiple blade hammer 30.

4. Illustrative Embodiments of Dual-Blade Hammer

Figure 19:
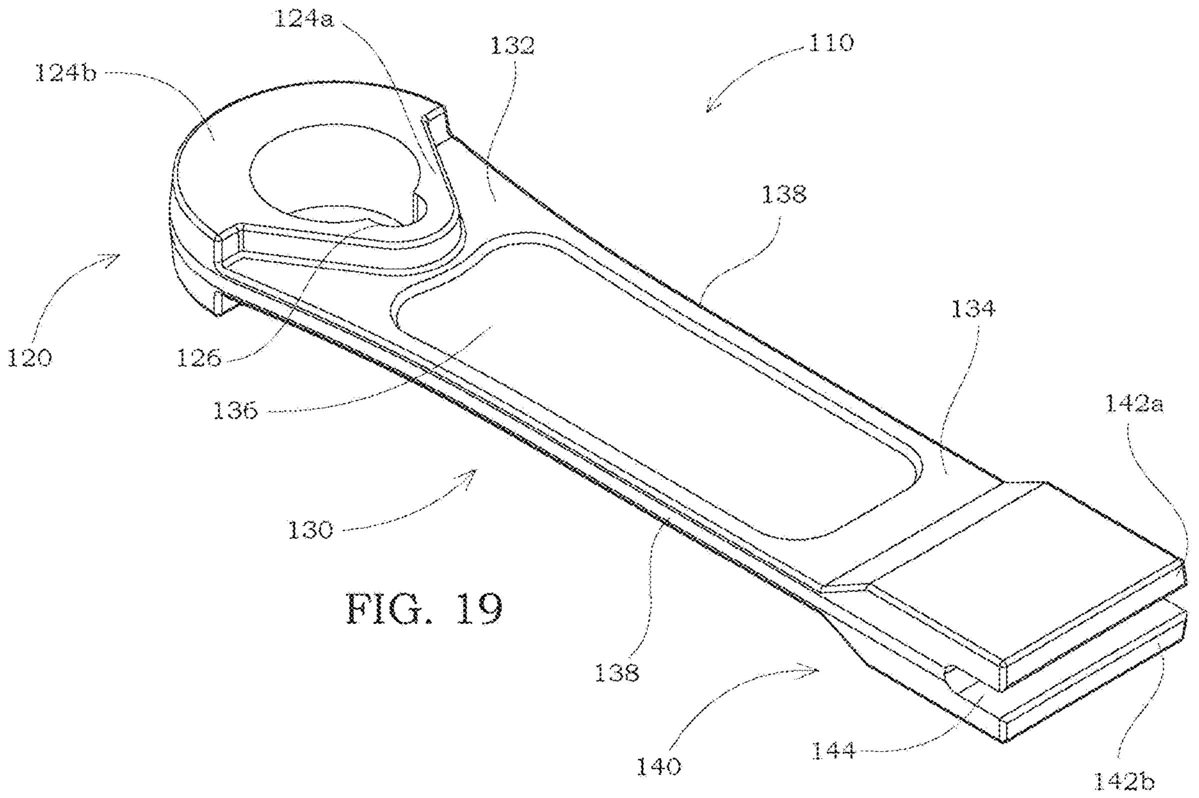
FIG. 19 provides a perspective view of one embodiment of a dual-blade hammer.

Referring now to the drawings, wherein like reference numerals designate identical or corresponding parts throughout the several views, FIG. 19 provides a perspective view of one embodiment the dual-blade hammer 110. The embodiment of the dual-blade hammer 110 pictured herein includes a connector end 120, a contact end 140, and a neck 130 positioned between the connector end 120 and contact end 140. In the embodiment pictured herein, the neck first end 132 is affixed to the connector end 120 and the neck second end 134 is affixed to the contact end 140.

Figure 20:
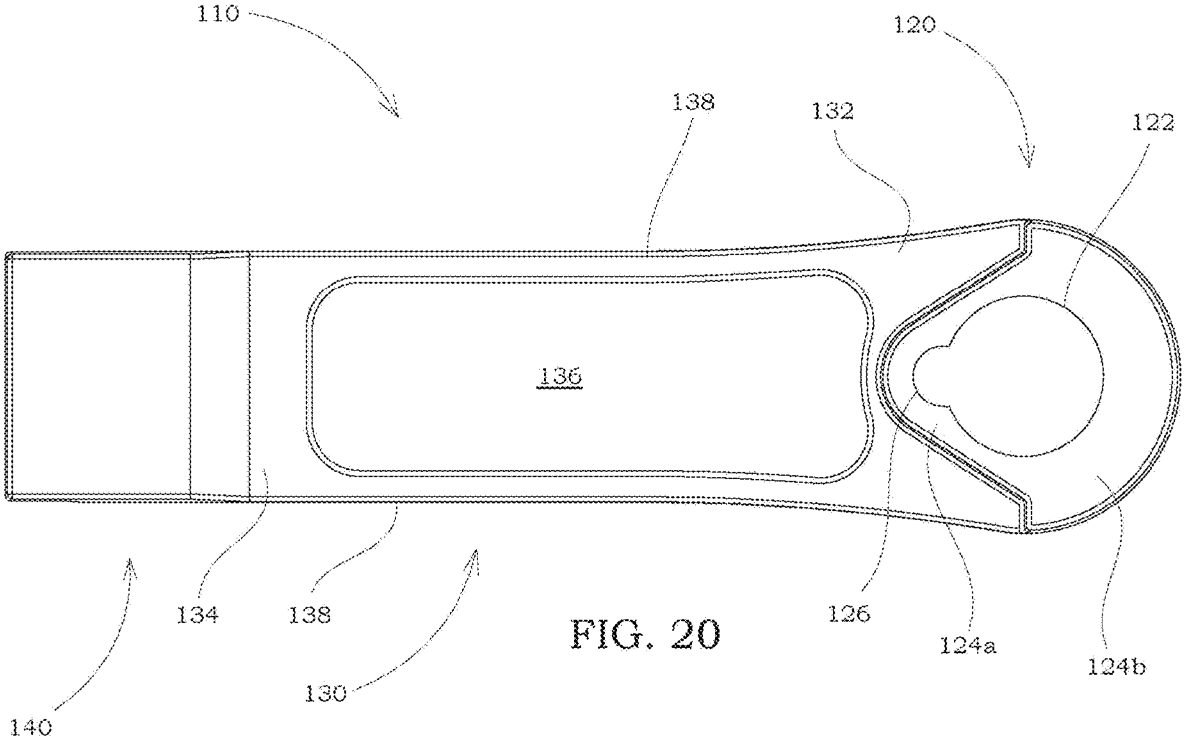
FIG. 20 provides a front view of one embodiment of the dual-blade hammer.

The connector end 120 in the embodiment pictured herein is formed with a rod hole 122 therethrough. The rod hole 122 may be formed with a notch 126 therein as well, as best shown in FIG. 20. The rod hole 122 serves to pivotally attach the dual-blade hammer 110 to a hammer pin or rod (neither shown) of a hammermill assembly. Hammer pins and rods used in hammermill assemblies and their operation are not further described herein for purposes of clarity, but are well known to those skilled in the art.

The connector end 120 may also include a first shoulder 124*a* positioned around the periphery of the rod hole 122. The notch 126 may protrude into the first shoulder 124*a*, as shown in the embodiment of the dual-blade hammer 110 pictured in FIGS. 19 and 20. A second shoulder 124*b* may also be positioned around a portion of the periphery of the first shoulder 124*a*. In the embodiment pictured herein, the second shoulder 124*b* encompasses approximately one-half of the periphery of the first shoulder and is positioned opposite the area of the first shoulder 124*a* in which the notch 126 is formed.

As shown herein, the first shoulder 124*a* is not generally circular in shape, but rather it is generally triangular in shape with a rounded vertex adjacent the notch 126, and the thicknesses of the first and second shoulders 124*a*, 124*b* are approximately equal. This configuration allows for discrepancies in the location of the rod hole 122 to account for machining differences within the hammermill That is, the precise location of the rod hole 122 and notch 126 may be adjusted by a predetermined amount along the length of the connector end 120 to adjust the swing length of the dual-blade hammer 110. That is, an area exists in the connector end 120 in which the rod hole 122 may be positioned such that the rod hole 122 is within the periphery of the first and second shoulders 124*a*, 124*b*. In such a case, the dual blade hammer 110 would be formed without a rod hole 122, and the rod hole 122 would be added just prior to installation in a hammermill so that the swing length of the dual-blade hammer 110 could be precisely set. The area in which the rod hole 122 could be formed may have a different size in one embodiment of the dual-blade hammer 110 to the next, and the amount of swing-length adjustment will also depend on the size of the rod hole 122. However, it is contemplated that the most critical dimension of this area will be along the length of the dual-blade hammer 110, and the amount of adjustment in that dimension may be as small or as large as required by the tolerances of the hammermill, and is therefore in no way limiting to the scope of the dual-blade hammer 110.

In the pictured embodiment of the dual-blade hammer 110, a line of symmetry exists along the length of the dual-blade hammer from the view shown in FIG. 20. This line of symmetry bisects the rod hole 122 and notch 126, and passes through the vertex of the first shoulder 124*a*. In other embodiments not pictured herein, the first shoulder 124*a* may extend further down the neck 130 than it does in the illustrative embodiment, allowing even more adjustment in the swing length of the dual-blade hammer 110. Alternatively, the first shoulder 124*a* may be generally semi-circular in shape, such as in the notched hammer first shoulder 14*a* shown in FIG. 15. Accordingly, the specific shape and/or configuration of the first shoulder 124*a* and/or second shoulder 124*b* in no way limit the scope of the dual-blade hammer 110 as disclosed and claimed herein.

Figure 21:
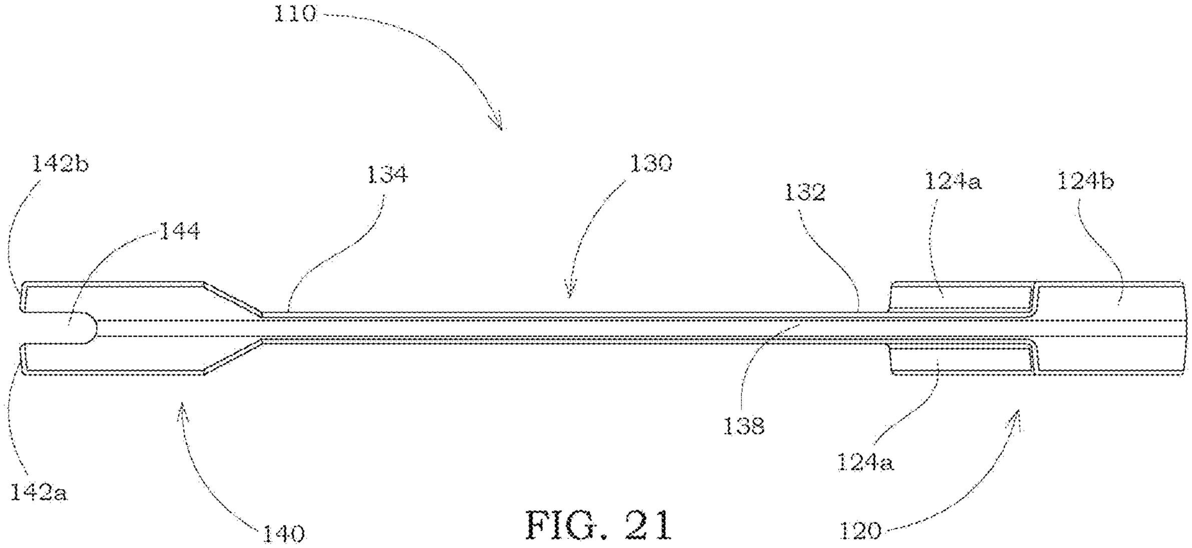
FIG. 21 provides a side view of one embodiment of the dual-blade hammer.

The first and/or second shoulders 124*a*, 124*b* provide increased strength and longevity to the dual-blade hammer 110 in many applications, as is well known to those skilled in the art. In the embodiment pictured herein, both the first and second shoulders 124*a*, 124*b* are positioned on both sides of the rod hole 122, which is best shown in FIG. 21.

However, in other embodiments not pictured herein, either the first or second shoulder 124*a*, 124*b* may be positioned on only one side of the rod hole 122. The optimal dimensions of both the first and second shoulders 124*a*, 124*b* will vary depending on the specific application of the dual-blade hammer 110, and are therefore in no way limiting to the scope of the dual-blade hammer 110. In the embodiment pictured herein, the thickness of both the first and second shoulders 124*a*, 124*b* is 0.75 inches.

Figure 22:
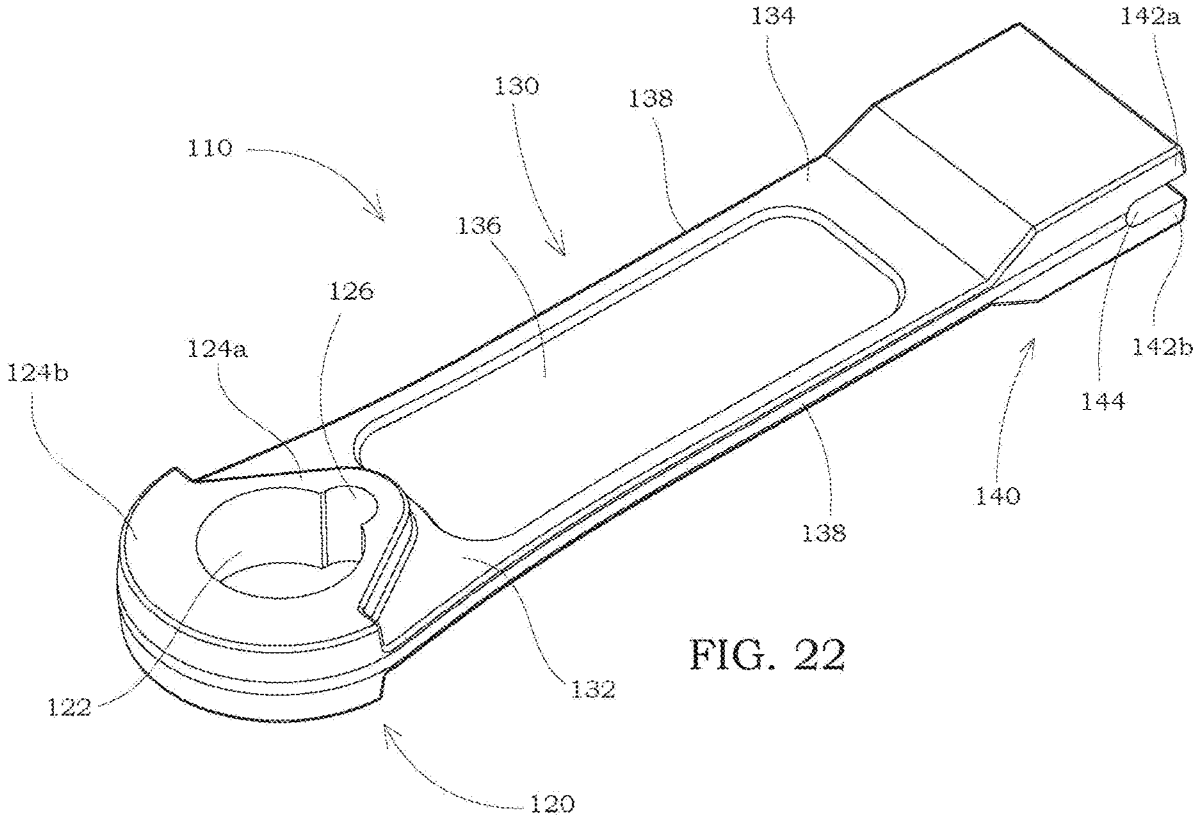
FIG. 22 provides a second perspective view of one embodiment of the dual-blade hammer.

In the embodiments pictured herein, the connector end 120 is rounded, as best shown in FIGS. 19, 20, and 22. In the embodiment of the dual-blade hammer 110 pictured herein, the outer diameter of the connector end is 2.5 inches. However, in other embodiments not pictured herein, the connector end 120 may have other shapes, such as rectangular, triangular, elliptical, or otherwise without departing from the spirit and scope of the dual-blade hammer 110 as disclosed herein. Furthermore, the relative dimensions and angles of the various elements of the dual-blade hammer 110 may be adjusted for the specific application of the dual-blade hammer 110, and therefore an infinite number of variations of the dual-blade hammer 110 exist, and such variations will naturally occur to those skilled in the art without departing from the spirit and scope of the dual-blade hammer 110.

As best shown in FIG. 20, the neck edges 138 of the embodiment of the dual-blade hammer 110 pictured herein are non-linear. In the embodiment pictured herein, curvature of both neck edges 138 is derived from a circle having a radius of eighteen inches. However, the precise orientation and/or configuration of the neck edges 138 are in no way limiting in scope. Accordingly, in other embodiments of the dual-blade hammer 110 not pictured herein the neck edges 138 may be linear. The optimal width, curvature, and configuration of the neck 30 will vary depending on the specific application of the dual-blade hammer 110, which may depend on the type of material to be comminuted.

The neck 130 of the dual-blade hammer 110 includes at least one neck recess 136, which is best shown in FIGS. 19, 20, and 22. The neck recess 136 in the embodiment pictured herein is generally rectangular in shape with rounded corners, but may have other shapes in other embodiments not shown herein. The curved portions of the neck recess 136 pictured herein are derived from circles having radii of three and one-half inches, which may be more or less in other embodiments not pictured herein. One or more neck recesses 136 may be formed in each side of the neck 130, and the optimal number, orientation, and configuration of neck recesses 136 will depend on the specific application of the dual-blade hammer 110. In the embodiment pictured herein, the dual-blade hammer 110 includes two identical neck recesses 136 symmetrically (with respect to the orientation shown in FIG. 21) positioned on each side of the neck 130.

In the embodiment pictured herein, each neck recess 136 protrudes into the neck 130 by 0.075 inches, such that the width of the neck 130 between the two neck recesses 136 is 0.1 inch. Accordingly, the thickness of the neck 130 at a position thereof in which no neck recesses 136 protrude is 0.25 inches. However, the dimensions of the neck 130, including the thickness thereof adjacent to neck recesses 136, and the dimensions, configuration, and/or placement of neck recesses 136 is in no way limiting to the scope of the dual-blade hammer 110. The dual-blade hammer 110 may have any number of neck recesses 136 (e.g., a single neck recess 136 on one side of the neck 130, multiple neck recesses 136 on one side of the neck 130, multiple recesses 136 on both sides of the neck 130, etc.). Furthermore, the neck recesses 136 may have any shape without departing from the spirit and scope of the dual-blade hammer 110 as disclosed and claimed herein. In other embodiments of the dual-blade hammer 110 not pictured herein the neck recess(s) 136 may extend through the neck 130. In such embodiments, the neck recess(s) 136 would appear as voids positioned in the neck 130. Several such embodiments of such voids are disclosed in U.S. Pat. No. 7,559,497, which is incorporated by reference herein in its entirety.

The neck second end 134 is affixed to the contact end 140. The contact end 140, which delivers energy to the material to be comminuted, may have an infinite number of configurations, the optimal of which will depend on the particular application of the dual-blade hammer 110. For example in embodiments not pictured herein, the contact end 140 may be comprised of a single contact surface with multiple contact points, or it may be configured with multiple contact surfaces having multiple contact points. Certain embodiments of the contact end 140 that may be included with the dual-blade hammer 10 are disclosed in U.S. patent application Ser. No. 12/398,007, which is incorporated by reference herein in its entirety.

In the embodiment pictured herein, the contact end 140 is formed with a first contact surface 142*a* and a second contact surface 142*b*, wherein the two contact surfaces 142*a*, 142*b* are separated from one another by an interstitial area 144. Other embodiments of the dual-blade hammer 110 may include a weld-hardened edge on one or more of the contact surfaces 142*a*, 142*b*. In the embodiment of the dual-blade hammer 110 pictured herein, the width of the contact end 140 is two inches, and the overall thickness of the contact end is 0.75 inches. The thickness of the interstitial area 144 is 0.1 inches. However, as stated above, the contact end 140 may take on any orientation and/or configuration without departing from the spirit and scope of the dual-blade hammer 110 as disclosed and claimed herein.

5. Illustrative Embodiments of a Recess Hammer

Figure 23A:
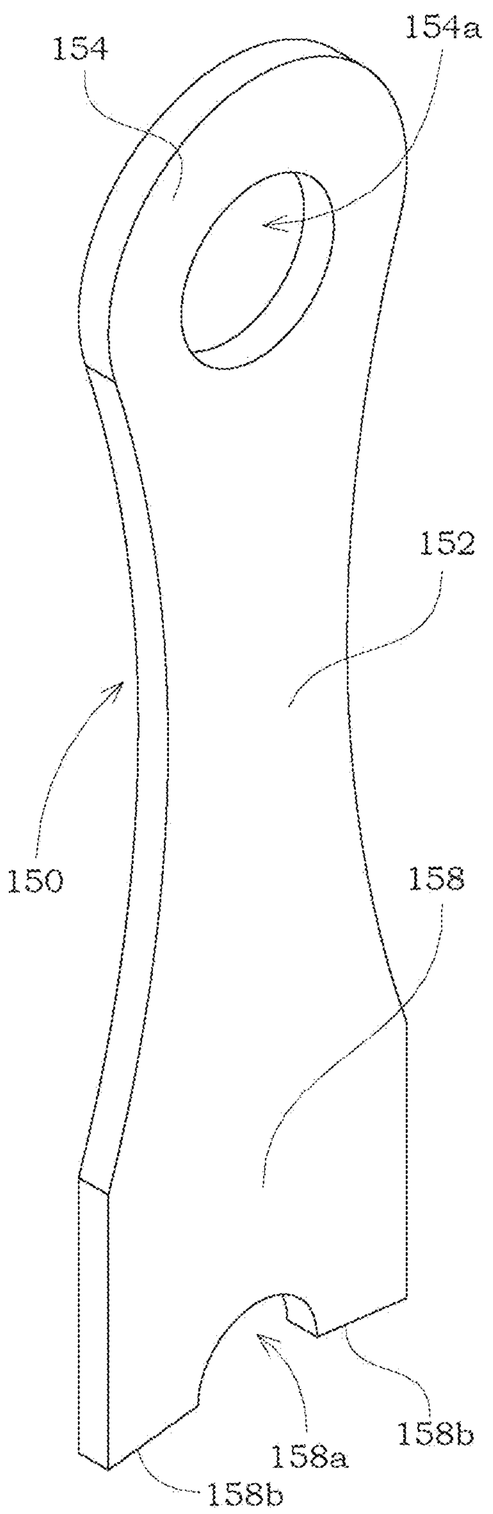
FIG. 23A provides a perspective view of a tenth embodiment of a hammer.
Figure 23B:
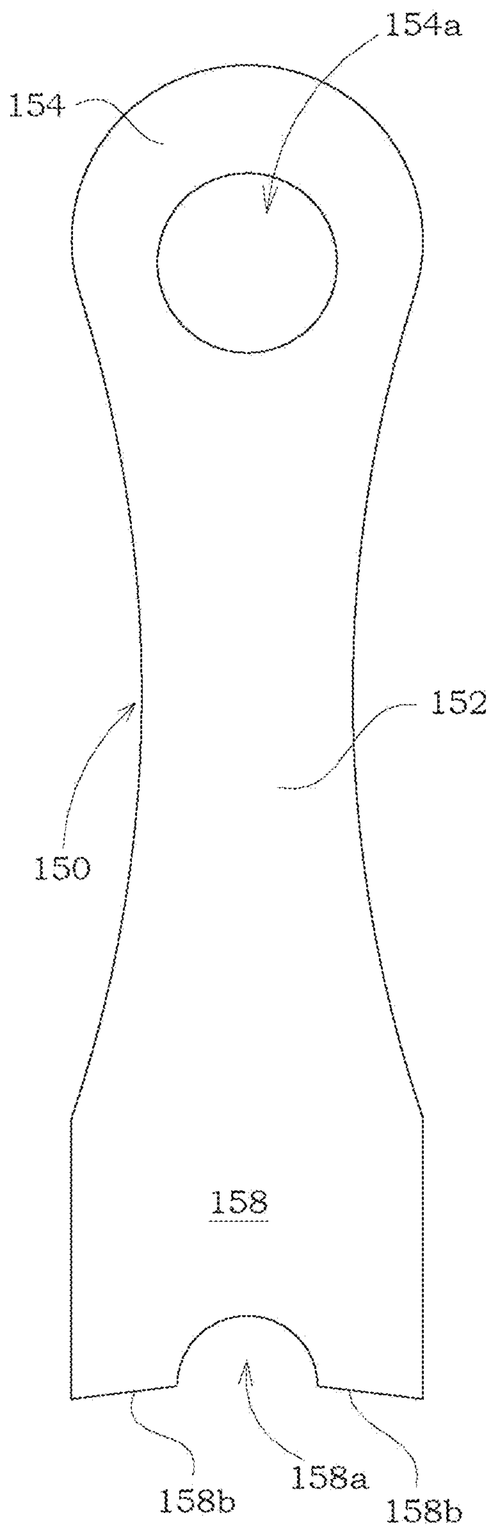
FIG. 23B provides a plane view of the tenth embodiment of a hammer.

A first embodiment of a recess hammer 150 is shown in FIGS. 23A & 23B. The recess hammer 150 as shown in FIGS. 23A & 23B is similar to various other hammers disclosed herein. However, it is contemplated that the recess hammer 150 may be fabricated through a cutting process, wherein a single sheet of material is provided and the recess hammer 150 is fashioned via plasma and/or laser cutting machines to the desired specifications. Accordingly, no die or forging is required to manufacture the recess hammer 150.

The recess hammer 150 may include a recess hammer connection end 154 that is joined with a recess hammer second end 158 via a recess hammer neck 152. It is contemplated that the recess hammer neck 152 may be as contoured as possible so as to remove the maximum amount of material from the recess hammer 150 while still maintaining an acceptable level of durability. The recess hammer connection end 154 may be configured such that the recess hammer rod hole 154*a* may have a variety of positions in the recess hammer connection end 154. For example, in the first embodiment it is contemplated that the center of the recess hammer rod hole 154*a* may be located anywhere from 8.0 to 8.25 inches from the furthest point on the recess hammer second end 158. Other configurations of the recess hammer 150 allow for more or less adjustment in the position of the recess hammer rod hold 154*a*. Accordingly, the specific location of the recess hammer rod hold 154*a* in no way limits the scope of the recess hammer 154.

As shown in FIGS. 23A & 23B, the recess hammer second end 158 may be formed with a recess hammer cavity 158*a* therein. In the pictured embodiments of the recess hammer 150, the cavity 158*a* may be generally configured as a semi-circle with a diameter of 1.0 inches. The overall length of the recess hammer 150 may be any length suitable for the particular application of the recess hammer 150, but in the pictured embodiment the overall length is 9.5 inches. The recess hammer neck 152 may be contoured on the sides thereof such that the narrowest portion of the recess hammer neck 152 is 1.25 inches and the recess hammer connection end 154 and second end 158 are both 2.5 inches in width. However, these dimensions are for illustrative purposes only and in no way limit the scope of the recess hammer 150 as disclosed and claimed herein.

The recess hammer cavity 158*a* is designed to catch material to be comminuted and accelerate it toward the screen. In the first embodiment of a recess hammer 150, the second end periphery 158*b* is configured so slope away from the recess hammer cavity 158*a* such that the second end periphery 158*b* substantially mimic the radius of a typical hammermill assembly 2 with which the recess hammer 150 may be used. That is, the second end periphery 158*b* may have a quasi-convex configuration. In the first embodiment of the recess hammer 150, the second end periphery 158*b* is angled so as to slope toward with recess hammer connection end 154 at an angle of 7 degrees. However, in other embodiments of the recess hammer 150 the angle of the second end periphery 158*b* with respect to the other elements of the recess hammer 150 will be different than 7 degrees. Accordingly, the specific angle of the second end periphery 158*b* with respect to the recess hammer cavity 158*a* is in no way limiting to the scope of the recess hammer 150.

Figure 23C:
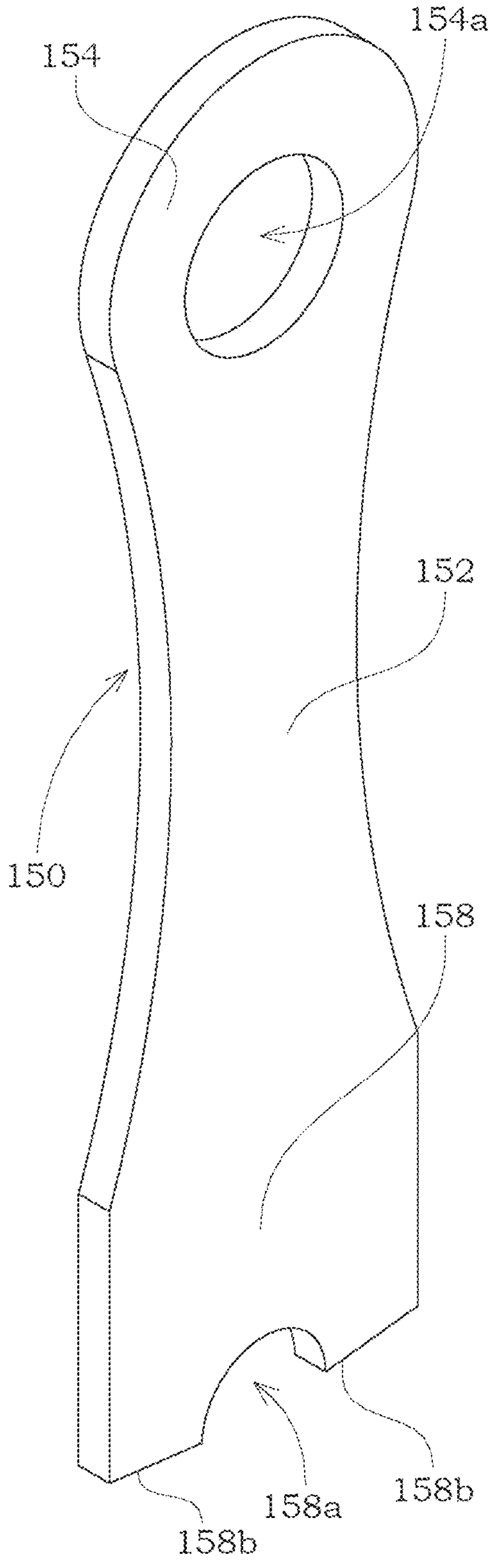
FIG. 23C provides a perspective view of an eleventh embodiment of a hammer.
Figure 23D:
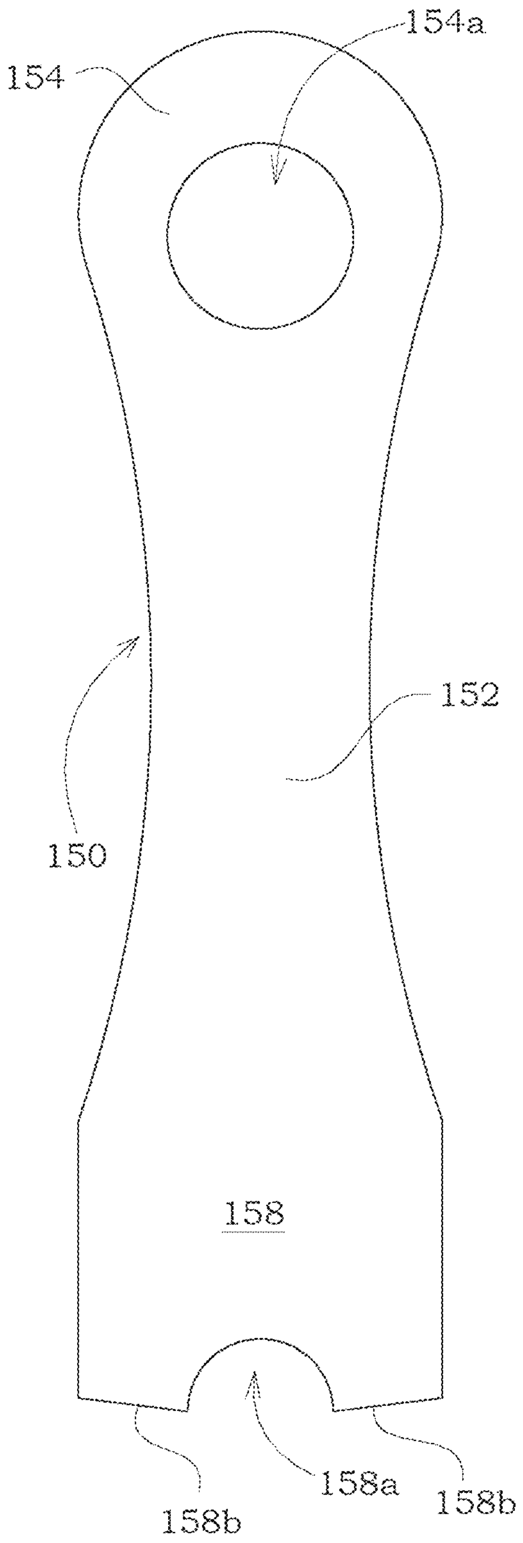
FIG. 23D provides a plane view of the eleventh embodiment of a hammer.

In a second embodiment of the recess hammer 150 as shown in FIGS. 23C & 23D, the angle of the second end periphery 158*b* is reversed from that shown in FIGS. 23A & 23B. That is, in the embodiment shown in FIGS. 23C & 23D, the second end periphery 158*b* is angled so as to slope away from the recess hammer connection end 154 at an angle of 7 degrees such that the second end periphery 158*b* has a quasi-concave configuration. This configuration is designed to throw the material to be comminuted toward the screen, as the ramp of the angle from the recess hammer cavity 158*a* may facilitate migration of material to be comminuted out of the recess hammer cavity 158*a*.

6. Illustrative Embodiments of a Double End Hammer

Figure 24A:
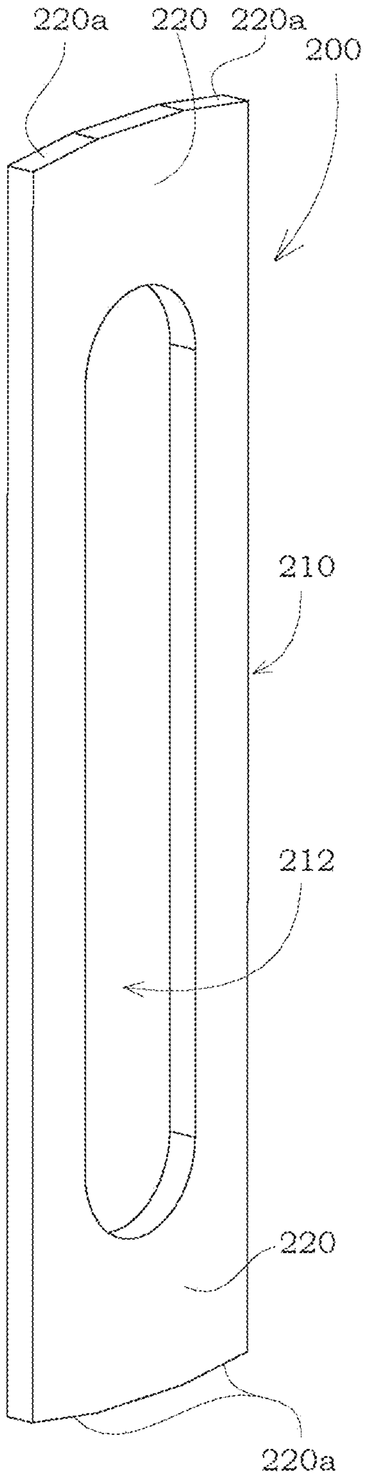
FIG. 24A provides a perspective view of a first embodiment of a dual end hammer.
Figure 24B:
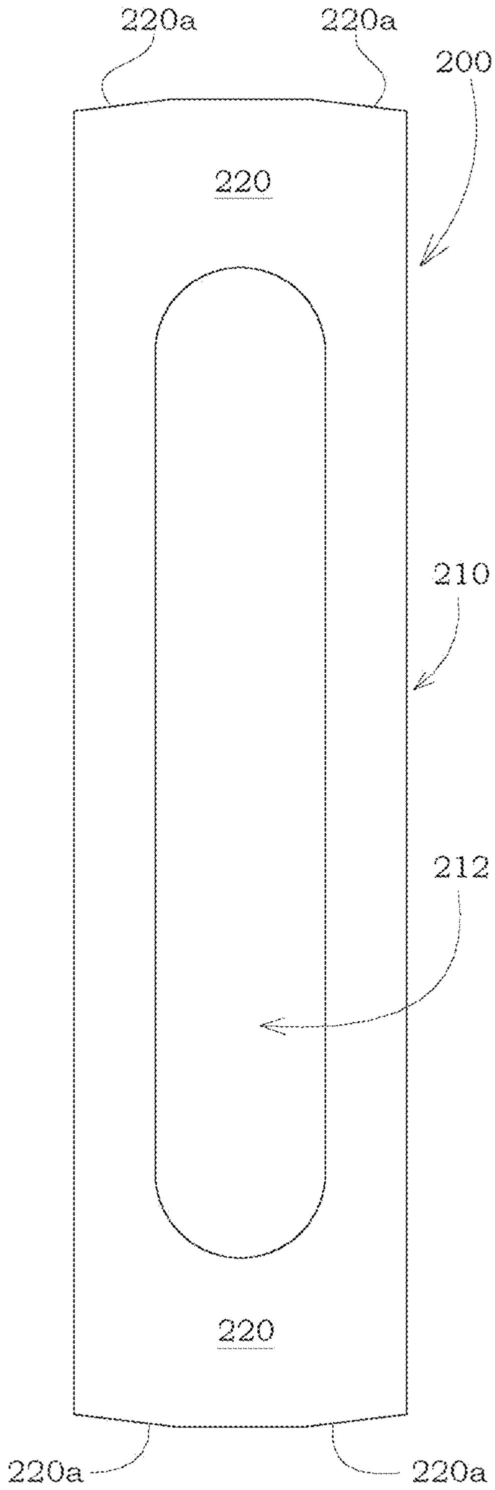
FIG. 24B provides a plane view of a first embodiment of a dual end hammer.
Figure 25A:
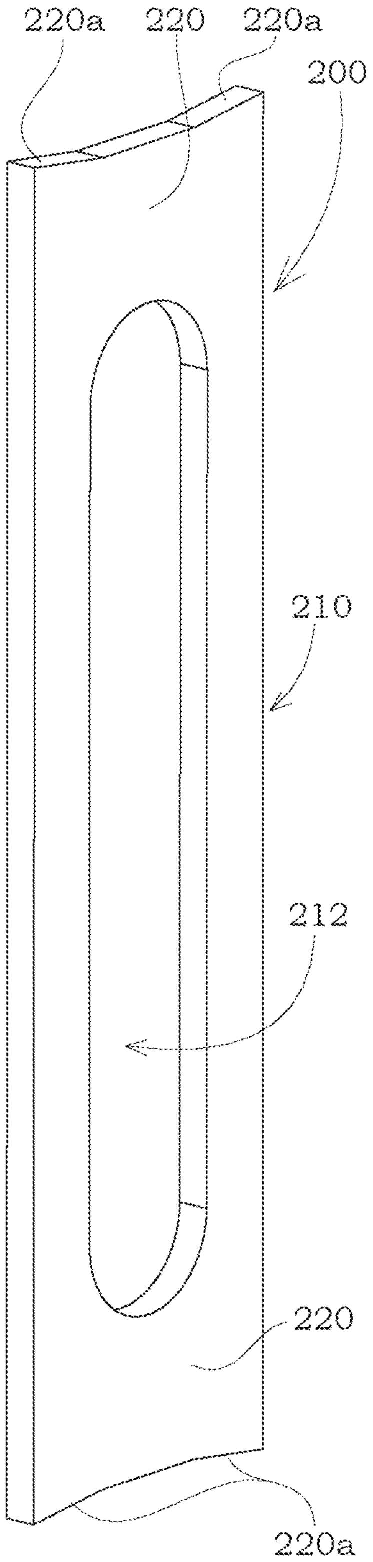
FIG. 25A provides a perspective view of a second embodiment of a dual end hammer.
Figure 25B:
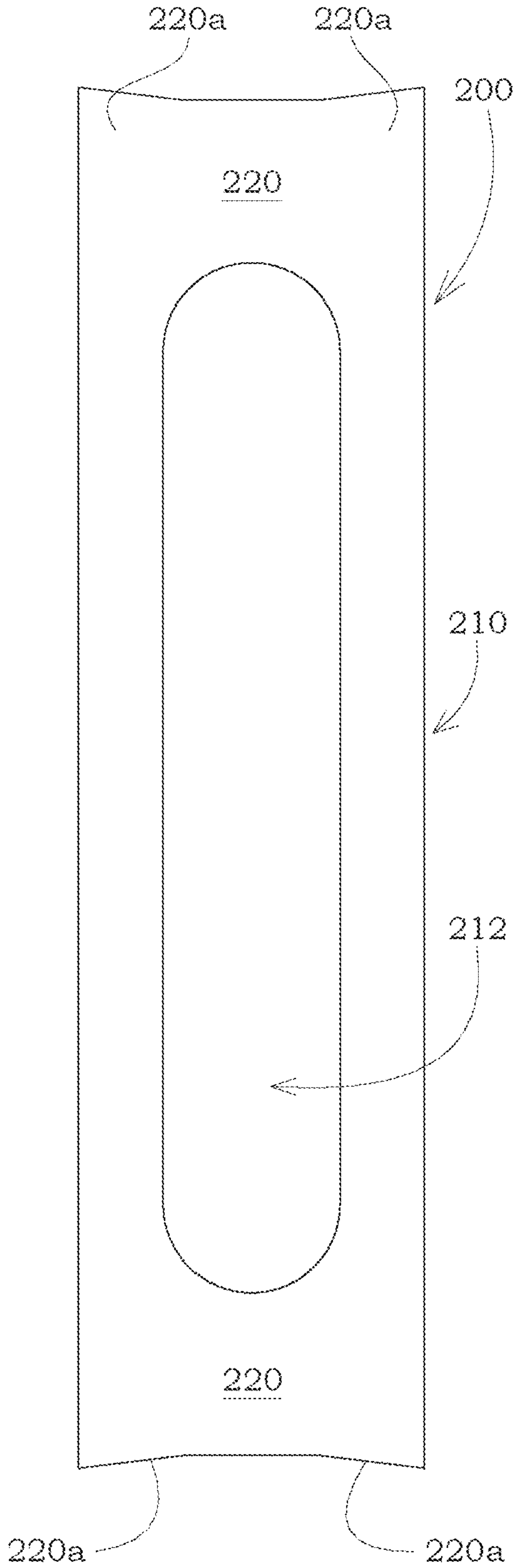
FIG. 25B provides a plane view of a second embodiment of a dual end hammer.

A first embodiment of a double end hammer 200 is shown in FIGS. 24A & 24B. This embodiment is shown with the same configuration of the contact end periphery 220*a* as the second end periphery 158*a* of the first embodiment of the recess hammer 150 (i.e., a 7 degree slope away from the centerline). However, FIGS. 25A & 25B shows a second embodiment of the double end hammer 200 wherein the contact end periphery 220*a* is configured in a similar manner to the second end periphery 158*a* of the second embodiment of the recess hammer 150. Accordingly, the specific angles and/or configuration of the contact end periphery 220*a* in no way limits the scope of the double end hammer 200 as disclosed and claimed herein.

The first and second embodiments of the double end hammer 200 includes a connection portion 210 generally situated about the center of the double end hammer 200 with a slot 212 formed therein. Two contact ends 220 are positioned at either end of the slot 212. Accordingly, once one contact end 220 is not performing as desired, the user may simply reposition the double end hammer 200 so that the opposite contact end 220 is adjacent the screen during use. It is contemplated that centrifugal force will retain the desired contact end 220 in the desired location during use for most materials.

In the pictured examples of the first and second embodiments of the double end hammer 200, the overall length is 10 inches, and the width is 2.5 inches. The slot 212 is 1.28 inches wide and 6.82 inches in length. However, the specific dimensions of the first and second embodiments of the double end hammer 200 will vary from one application to the next and are therefore illustrative dimensions provided herein in no way limiting to the scope of the double end hammer 200 as disclosed and claimed herein.

Figure 26A:
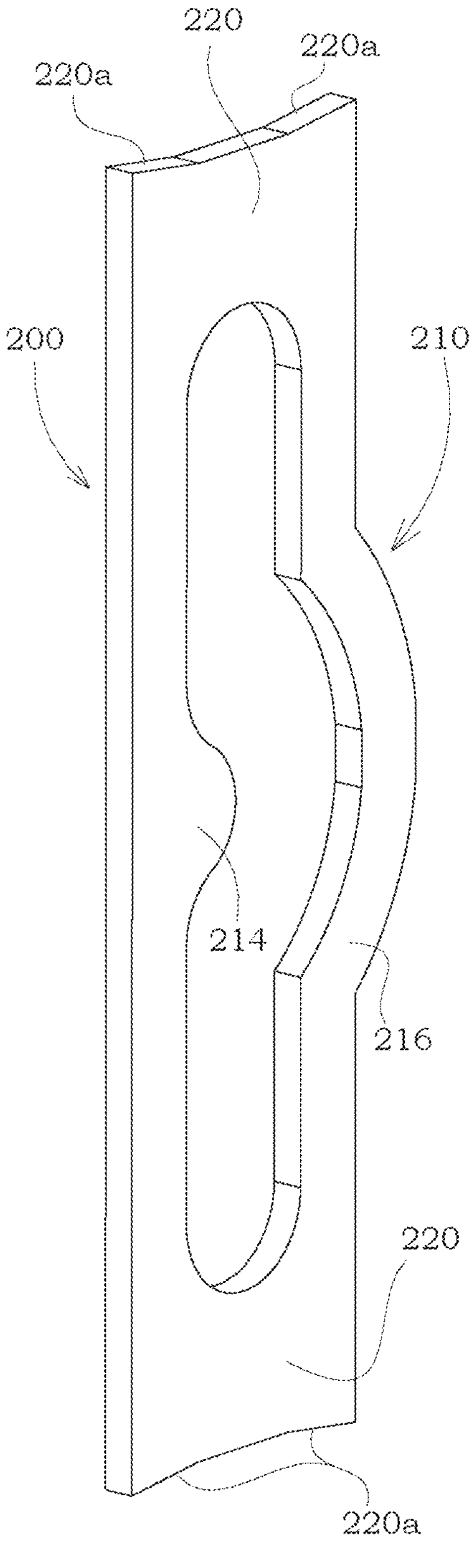
FIG. 26A provides a perspective view of a third embodiment of a dual end hammer.
Figure 26B:
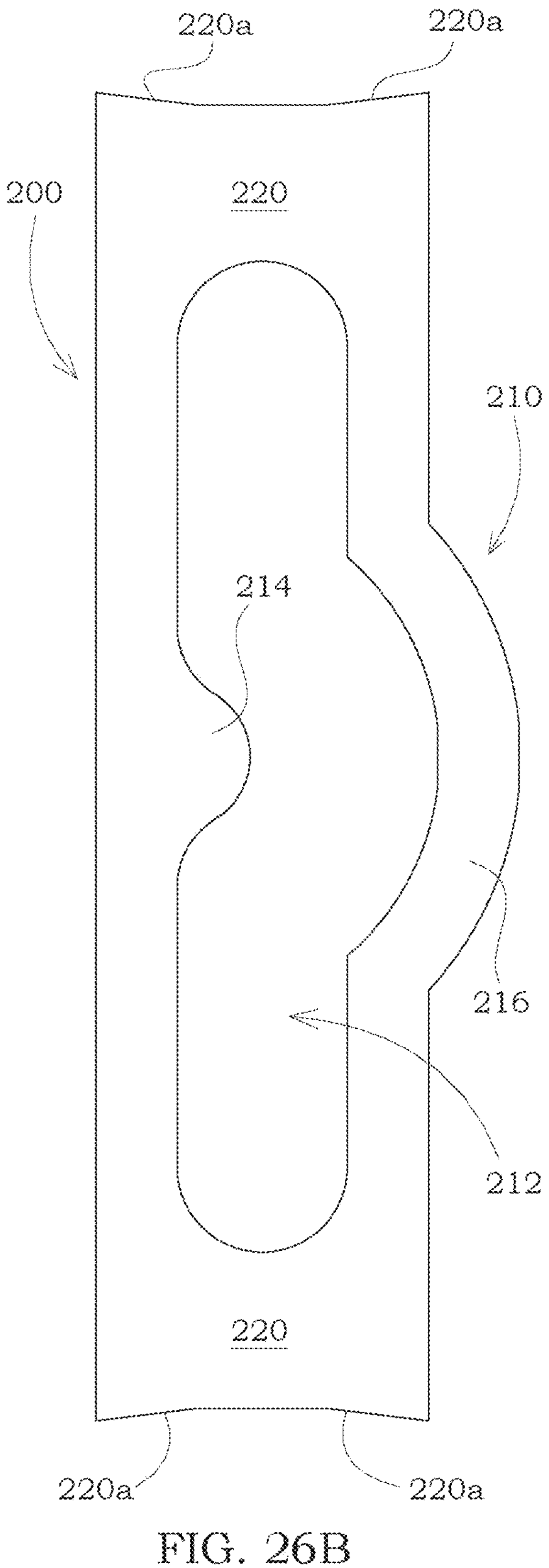
FIG. 26B provides a plane view of a third embodiment of a dual end hammer.

A third embodiment of a double end hammer 200 is shown in FIGS. 26A and 26B. The third embodiment of a double end hammer 200 is designed for use with materials for which the centrifugal force imparted to the double end hammer 200 via rotation of the hammermill assembly 2 may be insufficient to retain the double end hammer 200 in the desired opinion. A catch 214 may be formed in the slot 212 and a corresponding ridge 216 may also be formed in the slot 212. In this embodiment, if the force of the contact end periphery 220*a* against the material to be comminuted is greater than centrifugal force, the catch 214 will prevent the double end hammer 200 from being misplaced. In such a situation, the catch 214 will engage the hammer rod 8 to prevent the double end hammer 200 from moving away from the screen along the hammer rod 8. In this embodiment, the double end hammer 200 is allowed to slide along its length when attached to the hammer rod 8 by an amount equal to the distance between the end of the slot 212 and the edge of the catch 214.

As with the other embodiments of hammers 10, 30, 110, 150, 200, the overall length of the third embodiment of a double end hammer 200 may be any length suitable for the particular application of the double end hammer 200, but in the pictured embodiment the overall length is 10 inches. The ridge 216 in the second embodiment of the double end hammer 200 may extend 0.682 inches outward from the linear portion of the corresponding edge of the slot 212. Correspondingly, the catch 214 in the second embodiment of the double end hammer 200 may extend 0.682 inches outward from the linear portion of its corresponding edge of the slot 212 so that the width of the slot 212 is approximately constant along its length. However, these dimensions are for illustrative purposes only and in no way limit the scope of the double end hammer 200 as disclosed and claimed herein.

Figure 27A:
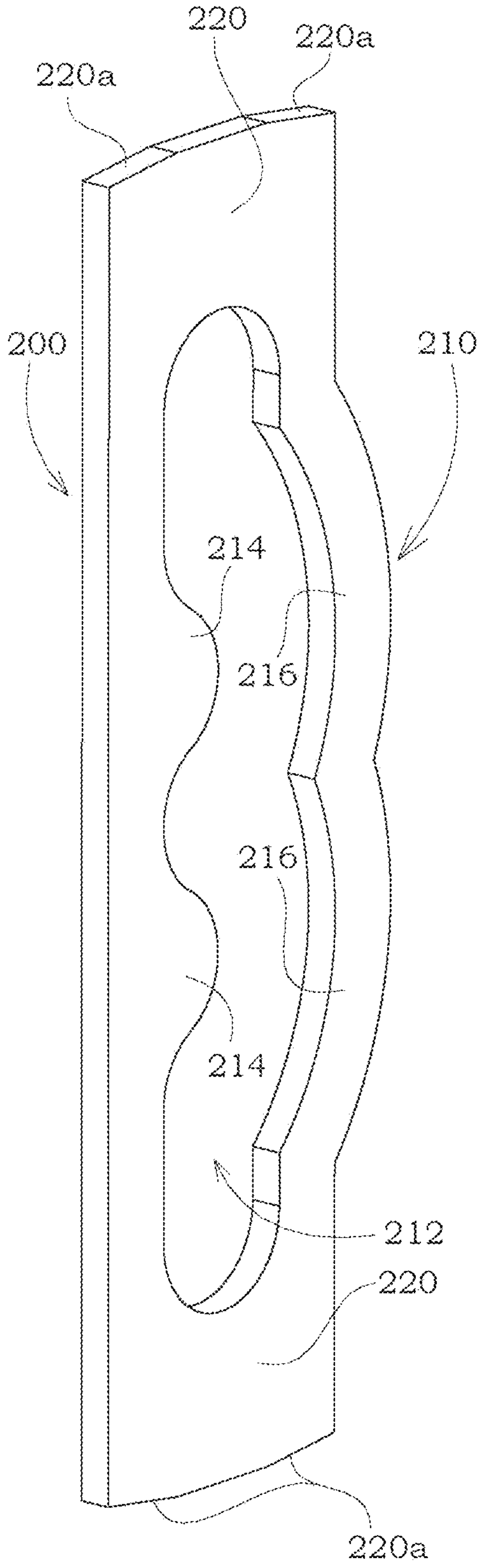
FIG. 27A provides a perspective view of a fourth embodiment of a dual end hammer.
Figure 27B:
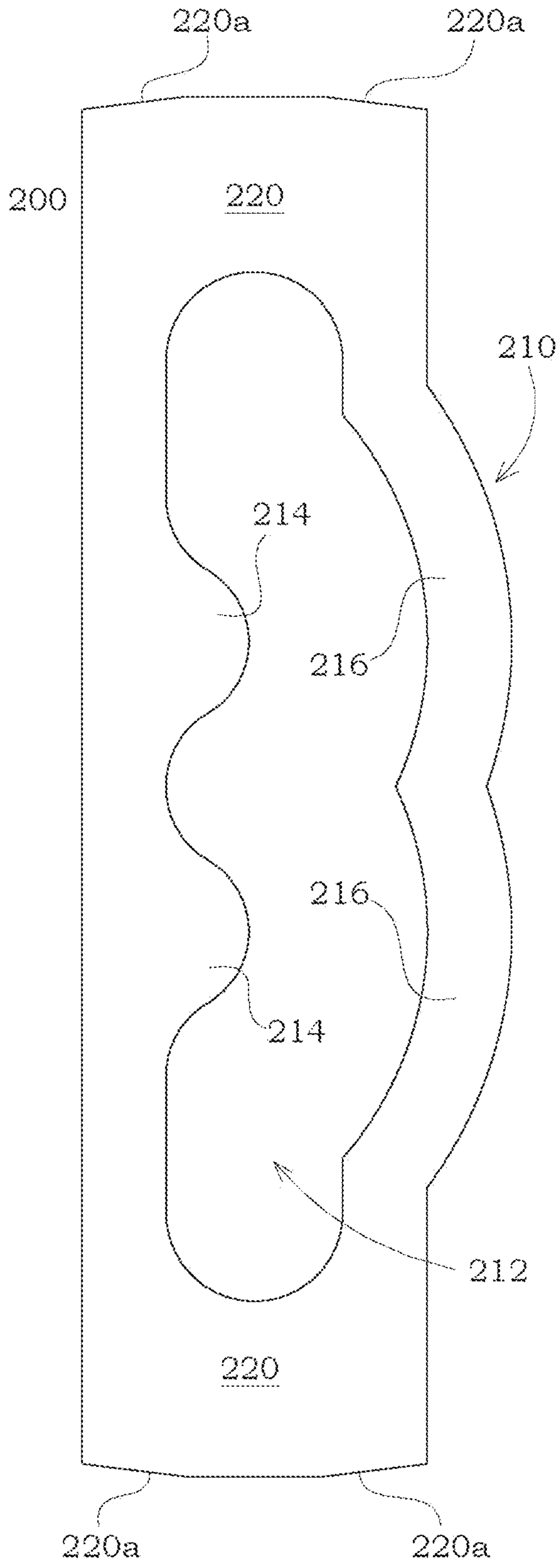
FIG. 27B provides a plane view of a fourth embodiment of a dual end hammer.

A fourth embodiment of a double end hammer 200 is shown in FIGS. 27A & 27B. In this embodiment of a double end hammer 200 two catches 214 are positioned in the slot 212, which catches 214 are accompanied by two ridges 216. The distance between the two catches 214 and to ridges 216 will vary depending on the application of the double end hammer 200, and is therefore in no way limiting to the scope of the double end hammer 200. In the embodiment pictured in FIGS. 27A & 27B, the geometric centers of the catches are approximately 2.5 inches, which dimension in no way limits the scope of the double end hammer 200 as disclosed and claimed herein. The presence of two catches 214 in the slot 212 further prevents the double end hammer 200 from being misplaced during use. Additionally, the distance along the length of the double end hammer 200 that the double end hammer 200 is allowed to slide with respect to the hammer rod 8 is decreased in this embodiment compared with that distance in the first, second, and third embodiments of the double end hammer 200. The contact end periphery 220*a* in the second embodiment of a double end hammer 200 may be formed with a positive or negative slope, or it may be substantially straight. Alternatively, the contact end 220 of the double end hammer 200 may be formed with a cavity therein (not shown) analogous to the recess hammer cavity 158*a* previously described. Finally, the double end hammer 200 may be formed with multiple blades, as shown herein for a multiple blade hammer 30 or dual-blade hammer 110.

7. Illustrative Embodiments of a Hammer Cluster

Referring now to FIGS. 28A-31B, illustrative embodiments of a hammer cluster 300 and illustrative embodiments of various components thereof are shown therein. The hammer cluster 300 may be comprised of at least one hammer 310 and at least one collar 320. In certain embodiments at least one spacer 330 may be included as described in further detail below. It is contemplated that the illustrative embodiment of a hammer cluster 300 disclosed herein may be configured for use in a free-swinging hammer mill, but the scope of the present disclosure is not so limited unless otherwise indicated in the following claims.

Figure 28A:
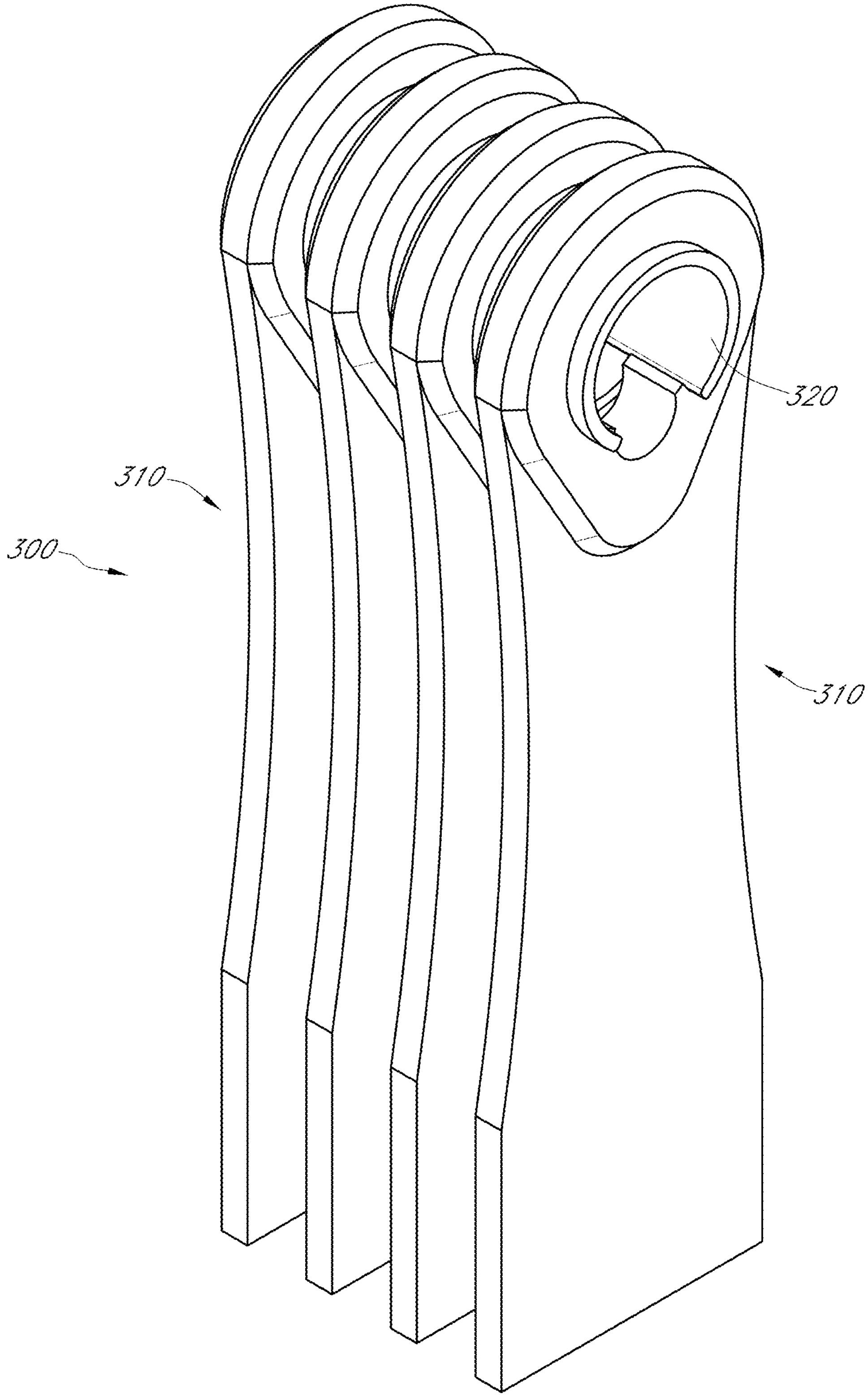
FIG. 28A provides a perspective view of an illustrative embodiment of a hammer cluster.
Figure 28B:
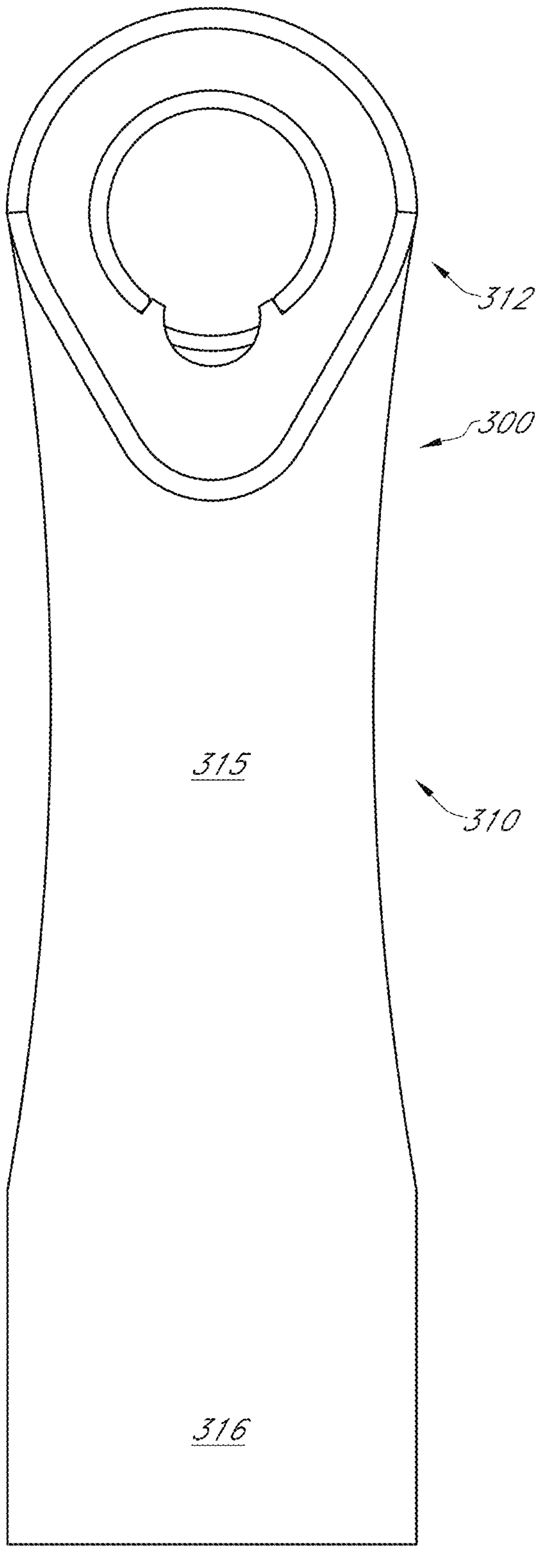
FIG. 28B provides an end view of the illustrative embodiment of a hammer cluster.
Figure 28C:
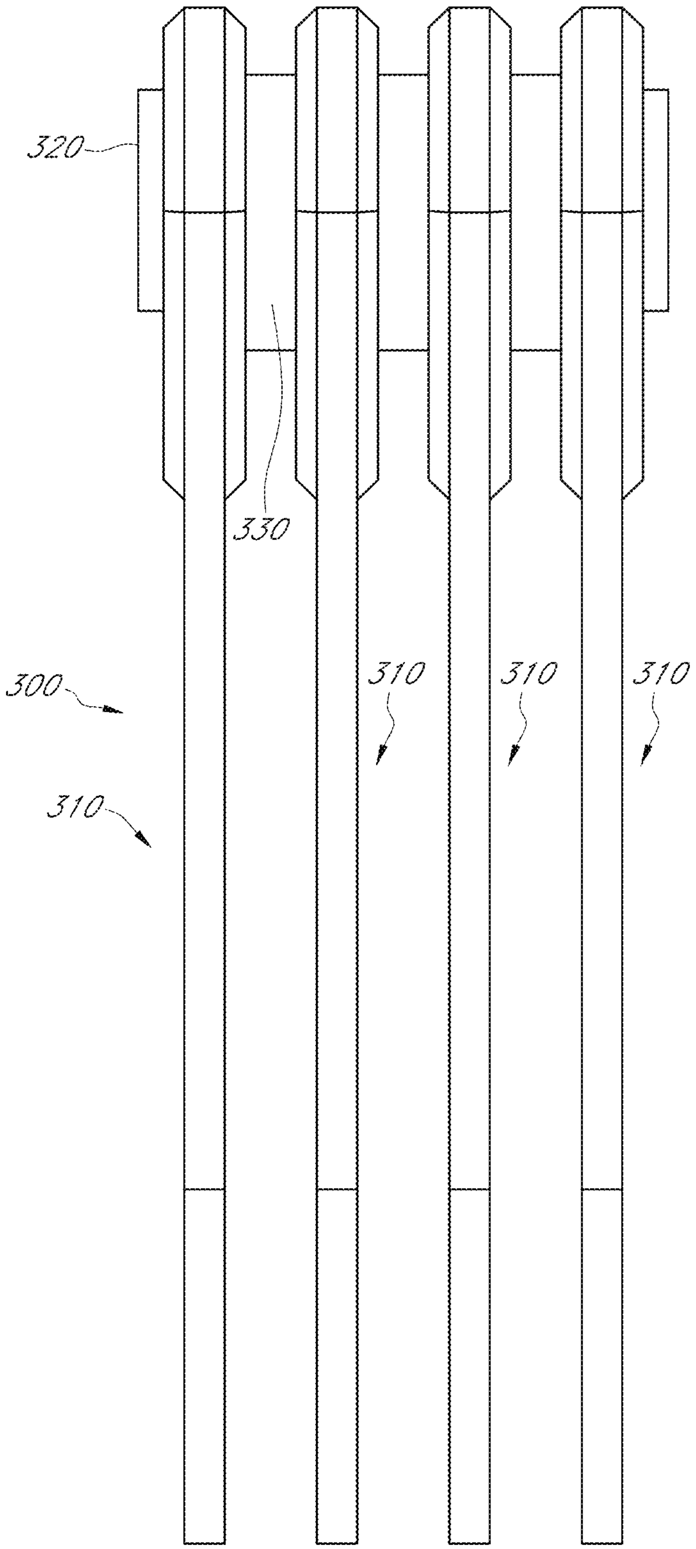
FIG. 28C provides a side view of the illustrative embodiment of a hammer cluster.

Referring now specifically to FIG. 28A, which provides a perspective view of a first illustrative embodiment of a hammer cluster 300, a hammer cluster 300 may be comprised of four hammers 310. An end view of the illustrative embodiment of a hammer cluster 300 is shown in FIG. 28B and a side view thereof is shown in FIG. 28C. Each hammer 310 may be configured with a connection portion 312 having a connection aperture 312*a* formed therein, a contact portion 316 opposite the connection portion 312, and a neck 315 connecting the connection portion 312 with the contact portion 316. The neck 315 may be configured with any desirable and/or suitable feature shown herein (e.g., voids, recesses, contoured edges, etc.), currently existing, or later developed without limitation unless otherwise indicated in the following claims.

Generally, the contact portion 312 may be configured to transfer mechanical energy and/or forces to a material to be comminuted in a hammer mill. The contact portion 316 may be configured with a one or more contact surfaces, pockets, blades, interstitial areas, and/or welded edges such as those shown in the hammers pictured in FIGS. 13-22 in any suitable combination, arrangement, and/or configuration without limitation unless otherwise indicated in the following claims.

Figure 29:
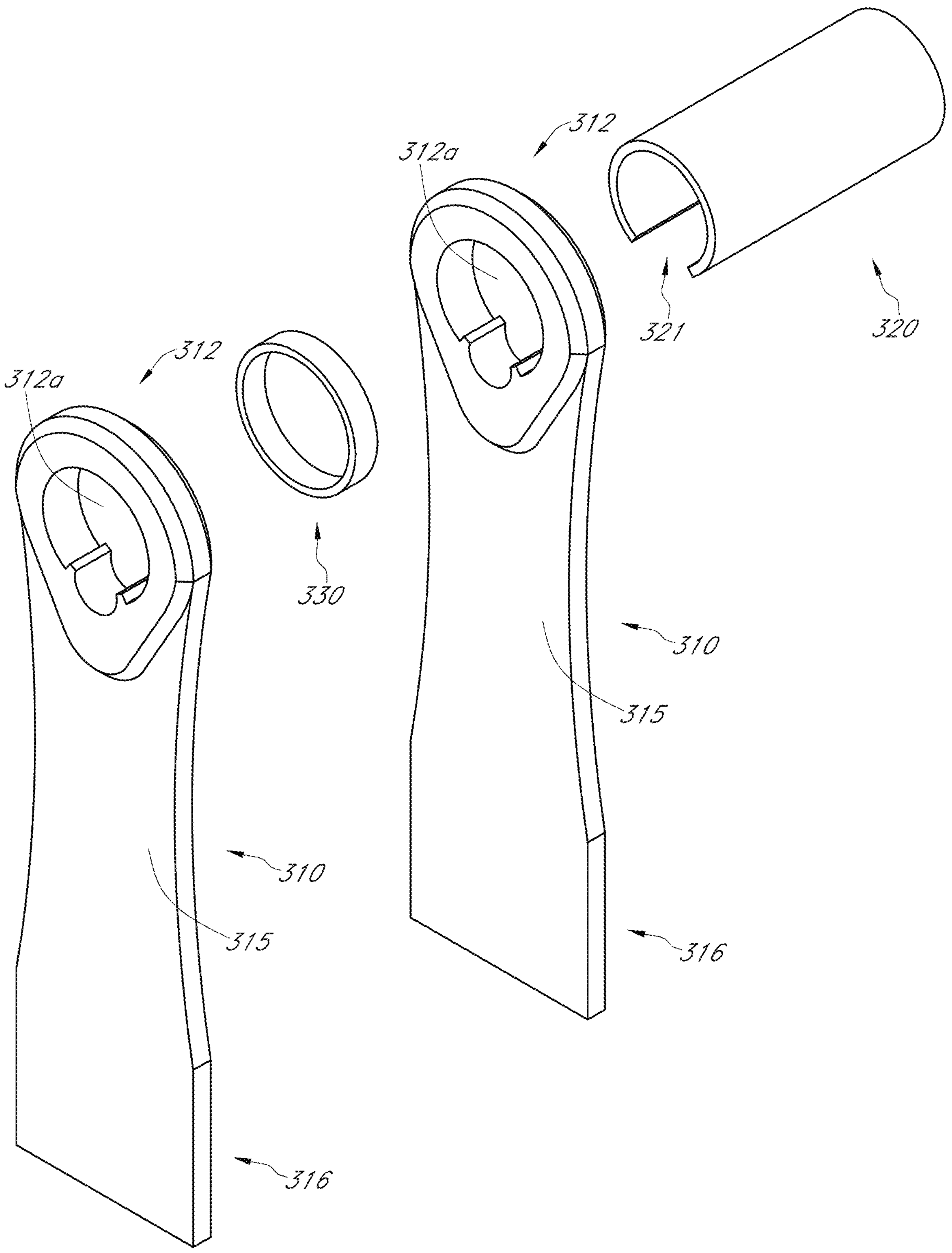
FIG. 29 provides and exploded perspective view of a portion of the illustrative embodiment of a hammer cluster.
Figure 30A:
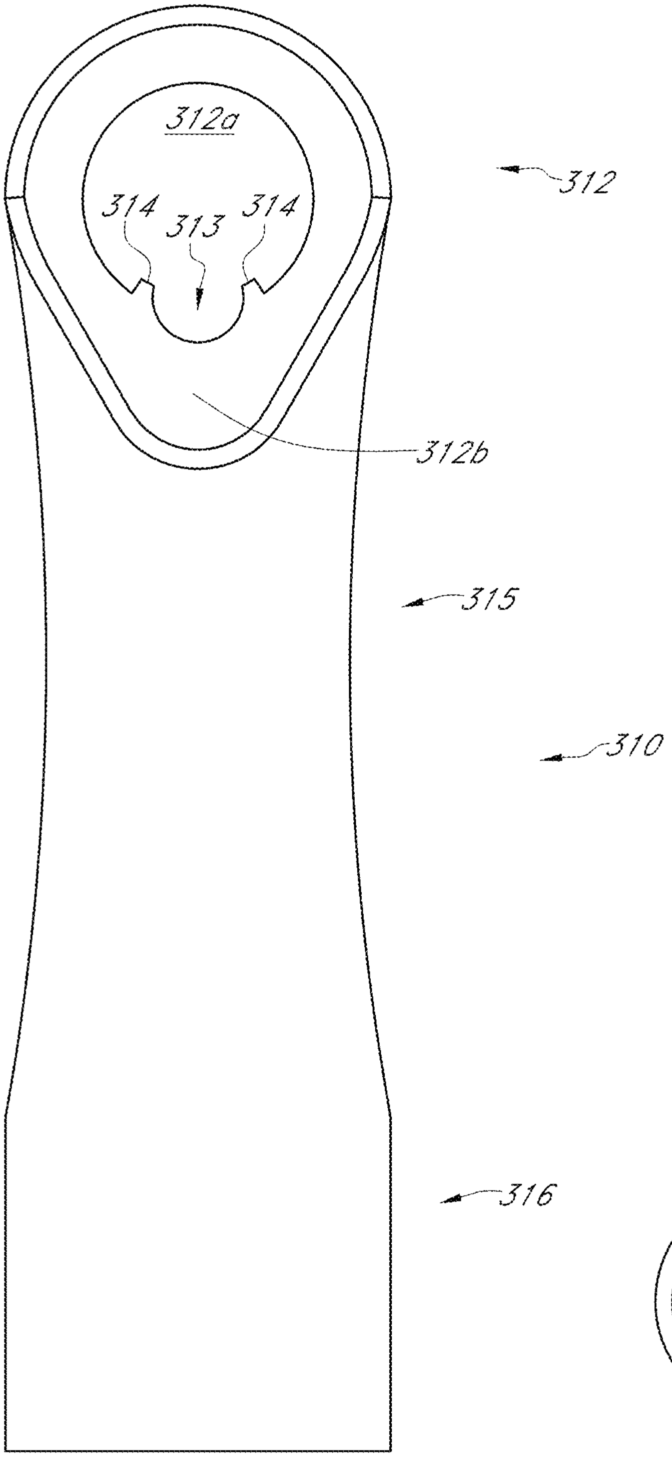
FIG. 30A provides an end view of an illustrative embodiment of a hammer that may be used in a hammer cluster.
Figure 30B:
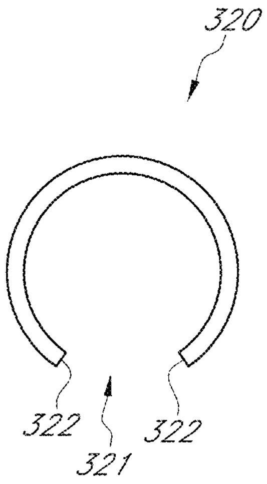
FIG. 30B provides an end view of an illustrative embodiment of a collar that may be used in a hammer cluster.
Figure 31A:
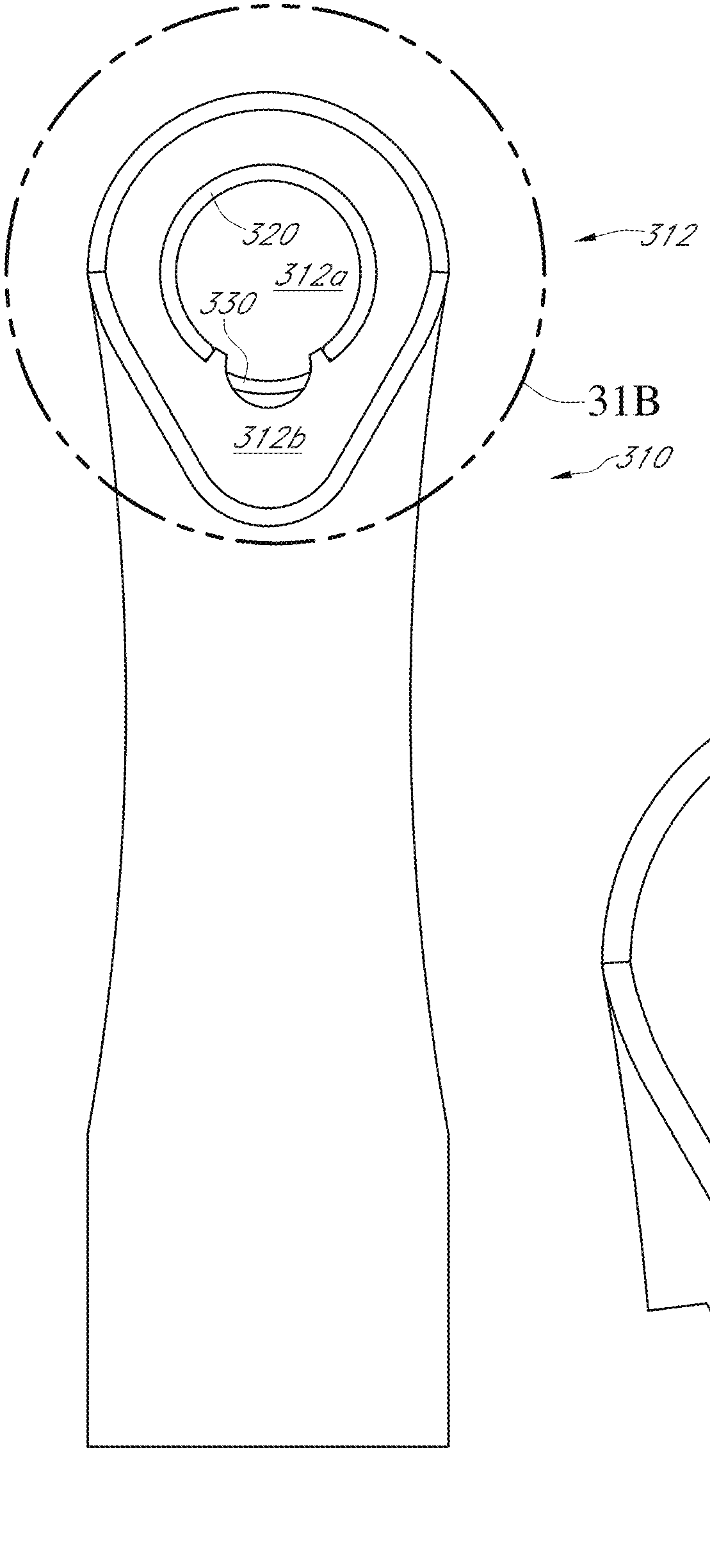
FIG. 31A provides an end view of the illustrative embodiment of a hammer, collar, and spacer engaged with one another.
Figure 31B:
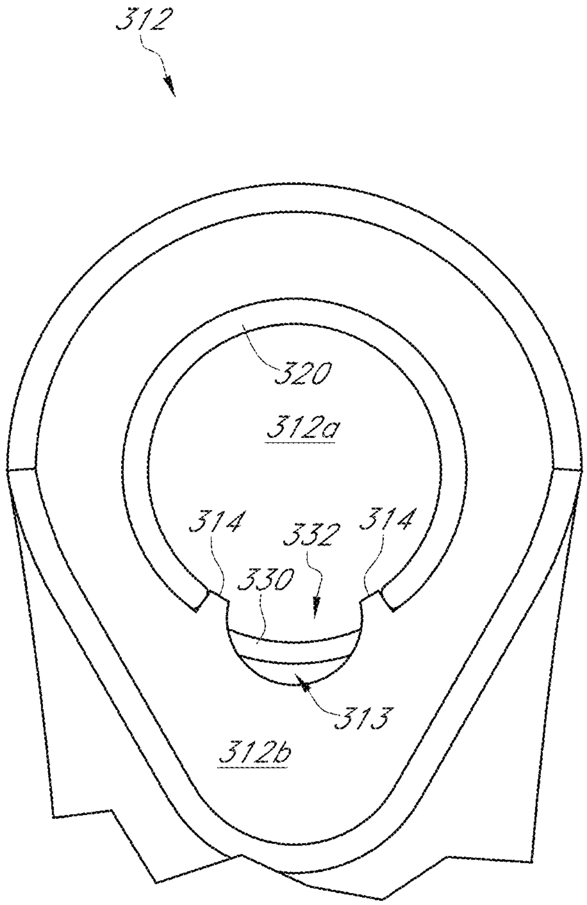
FIG. 31B provides a detailed view of the connection portion of the illustrative embodiment of a hammer engaged with the illustrative embodiments of a collar and spacer.

Referring now specifically to FIGS. 29 and 30A, the connection portion 312 of the hammer 310 may be configured with one or more shoulders 312*b* positioned around all or a portion of the connection aperture 312*a* without limitation unless otherwise indicated in the following claims. The shoulder(s) 312*b*, if present, may have any suitable configuration and the optimal configuration thereof will vary from one application to the next. Accordingly, the configuration of the shoulder(s) 312*b* (e.g., size, shape, etc.), if present, is therefore in no way limiting to the scope of the present disclosure unless otherwise indicated in the following claims.

The connection portion 312 may also be formed with a relief cavity 313, which may intersect a portion of the connection aperture 312*a* and which may extend into a portion of a shoulder 312*b*. Either side of the relief cavity 313 may terminate at the distal end of a tab 314, which tab 314 may intersect a portion of the connection aperture 312*a* and which tab may extend into a portion of the connection aperture 312*a* in a generally radial dimension. A collar 320 may be configured as a split cylinder having a collar gap 321 along the length thereof, as shown at least in FIGS. 28A, 29, and 30B. The outer diameter of the collar 320 may engage a semi-circular portion of the connection aperture 312*a* between the two tabs 314. The collar edges 322 (which collar edges 322 may cooperate to define the collar gap 321 as the open space between the collar edges 322) may engage respective tabs 314 such that the collar 320 may rotate with the hammer 310 around a hammer rod passing through the collar 320 during use while simultaneously leaving a continuous opening from the connection aperture 312*a* to the relief cavity 313.

Respective hammers 310 on a hammer cluster 300 may be laterally spaced from one another about the collar 320 via one or more spacers 330, three of which spacers 330 are clearly shown at least in FIG. 28C for the illustrative embodiment of a hammer cluster 300. In the illustrative embodiment of a hammer cluster 300 pictured herein, four hammers 310 may be equally spaced about a collar 320 with one spacer 330 positioned between adjacent hammers 310. The spacers 330 may be formed as rings, wherein the inner diameter of the spacer 330 may engage the outer diameter of the collar 320. However, other embodiments of the hammer cluster 300 may not require spacers 330 (e.g., an embodiment of a hammer 310 wherein the shoulder 312*b* extends further along the longitudinal axis of the collar 320), have differently configured spacers 330, differently configured hammers 310, differently spaced hammers 310 and/or spacers 330, and/or a different numbers of hammers 310 and/or spacers 330 within a given hammer cluster 300 without limitation unless otherwise indicated in the following claims.

Generally, it is contemplated that the collar 320 may be inserted into a plurality of hammers 310 such that the collar edges 322 engage the tabs 314 of each respective hammer 310, thereby effectively locking the hammers 310 of a respective hammer cluster 300 in place with respect to one another and the collar 320 in at least a rotational dimension, and thereby aligning each hammer 310 with one another in the respective hammer cluster 300. As shown at least in FIGS. 31A and 31B, this configuration may provide a relief cavity 313 adjacent the connection aperture 312*a* of each hammer 310 on the hammer cluster 300 such that material may be evacuated between the rod on which the hammer cluster 300 is mounted and the collar 320 of the hammer cluster 300.

This configuration may also provide one or more spacer cavities 332 that may have a radial dimension defined by a difference between the inner diameter of a spacer 330 and the outer diameter of the rod on which the hammer cluster 300 is engaged, which spacer cavity 332 may be provided by the collar gap 321, and which spacer cavity 332 may be located on a portion of the inner diameter of the spacer 330 positioned adjacent a relief cavity 313 of a hammer 310. It is contemplated that a spacer cavity 322 may have an arc length approximately equal to the distance between the two collar edges 322, extend along the entire axial dimension of the spacer 330, and have a radial dimension approximately equal to the radial thickness of the collar 320 without limitation unless otherwise indicated in the following claims. As shown at least in FIGS. 28A, 28B, 31A and 31B, each spacer cavity 332 may be positioned immediately adjacent a relief cavity 313 so as to provide an uninterrupted path along the length of the rod (and at a rotational position on the rod adjacent the relief cavity 313) with which the hammer cluster 300 is engaged along the entire length of the hammer cluster 300 without limitation unless otherwise indicated in the following claims.

The optimal cross-sectional area and/or volume of the spacer cavity 332 with respect to the relief cavity 313 may vary from application of the hammer cluster 300 to the next and is therefore in no way limiting to the scope of the present disclosure. Various dimensions of the spacer 330 (e.g., axial length, inner diameter, etc.) and/or other components of the hammer cluster 300 may be configured to manipulate the ratio of the cross-sectional area and/or volume of the spacer cavity 332 with respect to the relief cavity 313 to achieve a desired result. Accordingly, the relative dimensions, configurations, etc. of those elements may be varied without limitation unless otherwise indicated in the following claims.

Once the hammer cluster 300 is installed on a rod in a hammer mill, it is contemplated that the components of the hammer cluster 300 (i.e., the hammers 310, collar 320, and spacer(s) 330 (if present)) will swing on/rotate with respect to the rod as a single unit, wherein the inner diameter of the collar 320 may act as the bearing surface between the hammer cluster 300 and the rod. That is, the hammers 310 may be prevented from rotating with respect to the collar 320 due to the tabs 314 adjacent the relief cavity 313 engaging the collar edges 322. It is contemplated that such a configuration may distribute various forces and/or loads more uniformly on the hammers 310 during operation compared to hammers not engaged with a hammer cluster 300. Additionally, it is contemplated that this design may increase the life of the hammers 310 by reducing wear on both the rod on which the hammer cluster 300 is installed and the connection portion 312 of each hammer 310 (and specifically the connection aperture 312*a*). Such a configuration may also make installation of hammers within a hammer mill more efficient compared to the installation of hammers not engaged with a hammer cluster 300. In other embodiments, the spacer(s) 330 (if present) may be sized, shaped, and/or configured such that they may rotate with respect to the collar 320 without limitation unless otherwise indicated in the following claims.

Any of the various features, elements, and/or configurations of a hammer disclosed herein, currently existing, or later developed may be employed in a hammer 310 for use within a hammer cluster 300 depending on the suitability and/or inter-compatibility of the feature, element, and/or configuration without limitation unless otherwise indicated in the following claims. Additionally, the hammers 310 used in a hammer cluster 300 (as well as any collar 320 and/or spacer 330) may be constructed using any suitable method, including but not limited to forging, casting, machining, welding, etc., and/or combinations thereof without limitation unless otherwise indicated in the following claims.

The materials used to construct the apparatuses and/or components thereof will vary depending on the specific application thereof, but it is contemplated that metals, metal alloys, synthetic materials, and/or combinations thereof may be especially useful in some applications. Certain applications may require a high tensile strength material, such as steel, while others may require different materials, such as carbide-containing alloys. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects and embodiments of the various apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the apparatuses and embodiments pictured and described herein are for illustrative purposes only, and the scope of the present disclosure extends to all processes, apparatuses, and/or structures for providing the various benefits and/or features of the present disclosure unless so indicated in the following claims.

While the apparatuses according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the apparatuses and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the apparatuses are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. may be used alone or in combination with one another depending on the compatibility of the features, components, functionalities, advantages, aspects, configurations, process steps, process parameters, etc. Accordingly, a nearly infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the present disclosure has been described in connection with preferred aspects and specific examples, it is not intended that the scope be limited to the particular embodiments set forth, as the embodiments herein are intended in all respects to be illustrative rather than restrictive.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The invention claimed is:

1. A hammer comprising:
- a. a connection portion;
- b. a contact portion;
- c. a neck connecting said contact portion to said connection portion;
- d. a connection aperture formed in said connection portion and defining a connection aperture diameter;
- e. a first tab extending into said connection aperture;
- f. a second tab extending into said connection aperture, wherein said first tab and second tab define a tab radial diameter; and,
- g. a relief cavity intersecting said connection aperture wherein said connection aperture diameter is greater than said tab radial diameter.

2. The hammer according to claim 1 wherein said first and second tabs are further defined as symmetrically positioned with respect to a vertical line bisecting said connection aperture.

3. The hammer according to claim 2 wherein said first and second tabs are further defined as asymmetrically positioned with respect to a horizontal line bisecting said connection aperture.

4. The hammer according to claim 3 further comprising a shoulder surrounding a portion of said connection aperture.

5. The hammer according to claim 1 further comprising a welded edge at said contact portion.

6. The hammer according to claim 5 further comprising a shoulder surrounding a portion of said connection aperture.

7. A hammer cluster comprising:
- a. a first hammer, said first hammer comprising:
  - i. a connection portion;
  - ii. a contact portion;
  - iii. a neck connecting said contact portion to said connection portion;
  - iv. a connection aperture formed in said connection portion;
  - v. a first tab extending into said connection aperture; and,
  - vi. a second tab extending into said connection aperture;
- b. a second hammer, said second hammer comprising:
  - i. a connection portion;
  - ii. a contact portion;
  - iii. a neck connecting said contact portion to said connection portion;
  - iv. a connection aperture formed in said connection portion;
  - v. a first tab extending into said connection aperture; and,
  - vi. a second tab extending into said connection aperture;
- c. a curved collar positioned in said connection aperture of said first hammer and said connection aperture of said second hammer, wherein said curved collar includes a first collar edge engaged with said first tabs of said first and second hammers and a second collar edge engaged with said second tabs of said first and second hammers, and wherein an outer surface of said curved collar abuts an inner surface of said connection apertures of said first and second hammers wherein said outer surface of said curved collar and said inner surface of said connection apertures of said first and second hammers are non-curved in the distal dimension.

8. The hammer cluster according to claim 7 further comprising an annular spacer positioned between said connection portion of said first hammer and said connection portion of said second hammer.

9. The hammer cluster according to claim 8 wherein a periphery of said spacer is greater than a periphery of said connection aperture of said first hammer and a periphery of said connection aperture of said second hammer.

10. The hammer cluster according to claim 9 wherein said periphery of said spacer is greater than an outer diameter of said collar.

11. The hammer cluster according to claim 10 further comprising a spacer cavity positioned on a radially interior surface of said spacer.

12. The hammer cluster according to claim 7 wherein said first and second tabs of said first hammer are further defined as symmetrically positioned with respect to a vertical line bisecting said connection aperture of said first hammer.

13. The hammer cluster according to claim 12 wherein said first and second tabs of said first hammer are further defined as asymmetrically positioned with respect to a horizontal line bisecting said connection aperture of said first hammer.

14. The hammer cluster according to claim 13 wherein said first hammer further comprises a shoulder surrounding a portion of said connection aperture of said first hammer.

15. The hammer cluster according to claim 14 wherein said shoulder is further defined as being configured to increase a thickness of said connection portion of said first hammer where said shoulder is positioned.

16. The hammer cluster according to claim 7 wherein said first hammer further comprises a relief cavity intersecting said connection aperture of said first hammer.

17. The hammer cluster according to claim 7 wherein said first hammer contact end has a welded edge.

18. A method of securing a rotational position of a first hammer with a rotational position of a second hammer, said method comprising the steps of:
- a. engaging the first hammer with a curved collar, said first hammer comprising:
  - i. a connection portion;
  - ii. a contact portion;
  - iii. a neck connecting said contact portion to said connection portion;
  - iv. a connection aperture formed in said connection portion;
  - v. a first tab extending into said connection aperture; and,
  - vi. a second tab extending into said connection aperture, wherein said first and second tabs are symmetrically positioned with respect to a vertical line bisecting said connection aperture;
- b. engaging the second hammer with said curved collar, said second hammer comprising:
  - i. a connection portion;
  - ii. a contact portion;
  - iii. a neck connecting said contact portion to said connection portion;
  - iv. a connection aperture formed in said connection portion;

v. a first tab extending into said connection aperture; and, vi. a second tab extending into said connection aperture, wherein said first and second tabs are symmetrically positioned with respect to a vertical line bisecting said connection aperture;

c. wherein said curved collar is positioned in said connection aperture of said first hammer and said connection aperture of said second hammer, wherein said curved collar includes a first collar edge engaged with said first tabs of said first and second hammers and a second collar edge engaged with said second tabs of said first and second hammers, and wherein said outer surface of said curved collar and said inner surface of said connection apertures of said first and second hammers are non-curved in the distal dimension.

19. The method according to claim 18 further comprising the step of positioning a spacer between said first hammer and said second hammer.

20. The method according to claim 19 wherein a periphery of said spacer is further defined as greater than a periphery of said connection aperture of said first hammer and a periphery of said connection aperture of said second hammer.

21. The method according to claim 20 wherein said periphery of said spacer is further defined as greater than an outer diameter of said collar.

22. The method according to claim 18 further comprising the step of adding a welded edge to said first hammer contact end.

* * * * *